(12) United States Patent
Niiho et al.

(10) Patent No.: US 9,048,952 B2
(45) Date of Patent: Jun. 2, 2015

(54) COMMUNICATION CABLE APPARATUS INCLUDING SWITCH TURNED OFF IN REVERSE CONNECTION STATE OF COMMUNICATION CABLE APPARATUS

(71) Applicant: Panasonic Intellectual Property Management Co., Ltd., Osaka (JP)

(72) Inventors: Tsutomu Niiho, Osaka (JP); Osamu Shibata, Hyogo (JP); Yoshiyuki Saito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 229 days.

(21) Appl. No.: 13/793,379

(22) Filed: Mar. 11, 2013

(65) Prior Publication Data

US 2013/0183045 A1 Jul. 18, 2013

Related U.S. Application Data

(63) Continuation of application No. PCT/JP2012/006442, filed on Oct. 5, 2012.

(30) Foreign Application Priority Data

Dec. 27, 2011 (JP) .................................. 2011-284892

(51) Int. Cl.
  *H04B 10/06* (2006.01)
  *H04B 10/12* (2006.01)
  *H04B 10/25* (2013.01)
  *G02B 6/28* (2006.01)

(52) U.S. Cl.
  CPC . *H04B 10/25* (2013.01); *G02B 6/28* (2013.01)

(58) Field of Classification Search
  CPC .................................. H04B 10/25; G02B 6/28
  See application file for complete search history.

(56) References Cited

U.S. PATENT DOCUMENTS

| 6,088,497 | A  | * | 7/2000 | Phillips et al. ................... 385/48 |
| 7,401,985 | B2 | * | 7/2008 | Aronson et al. ................ 385/89 |
| 2003/0132941 | A1 | * | 7/2003 | Echizenya ..................... 345/520 |
| 2005/0105913 | A1 | * | 5/2005 | Ozeki et al. ................... 398/140 |

(Continued)

FOREIGN PATENT DOCUMENTS

| JP | 2003-209920 | 7/2003 |
| JP | 2005-295176 | 10/2005 |

(Continued)

OTHER PUBLICATIONS

International Preliminary Report on Patentability and Written Opinion of the International Searching Authority issued Jul. 10, 2014 in International (PCT) Application No. PCT/JP2012/006442.

*Primary Examiner* — Ken Vanderpuye
*Assistant Examiner* — Amritbir Sandhu
(74) *Attorney, Agent, or Firm* — Wenderoth, Lind & Ponack, L.L.P.

(57) ABSTRACT

A switch is inserted and connected between a first portion and a second portion of an HPD line. The switch connects the first portion to the second portion when an HPD signal is outputted to the second portion. The switch cuts off the connection between the first portion and the second portion when the HPD signal is not outputted to the second portion. An AND gate generates a connection state detection signal that represents the connection state of an HDMI optical active cable, and outputs the connection state detection signal to a switch.

7 Claims, 14 Drawing Sheets

(56) References Cited

U.S. PATENT DOCUMENTS

| | | | |
|---|---|---|---|
| 2006/0077778 A1* | 4/2006 | Tatum et al. | 369/44.11 |
| 2007/0058976 A1* | 3/2007 | Tatum et al. | 398/99 |
| 2009/0150589 A1* | 6/2009 | Watarai et al. | 710/302 |
| 2009/0167946 A1 | 7/2009 | Samada et al. | |
| 2010/0033026 A1* | 2/2010 | Goto et al. | 307/126 |
| 2010/0097529 A1* | 4/2010 | Tokoro | 348/730 |
| 2010/0132001 A1* | 5/2010 | Kitano et al. | 725/118 |
| 2010/0289530 A1 | 11/2010 | Nakajima et al. | |
| 2010/0309382 A1* | 12/2010 | Matsubayashi | 348/723 |
| 2011/0115287 A1* | 5/2011 | Morita et al. | 307/9.1 |
| 2011/0150401 A1 | 6/2011 | Furuyama | |
| 2011/0292295 A1* | 12/2011 | Kawai | 348/723 |
| 2012/0002562 A1* | 1/2012 | Kawade | 370/252 |
| 2012/0036284 A1* | 2/2012 | Tao et al. | 710/16 |
| 2012/0069158 A1* | 3/2012 | Iwamura et al. | 348/51 |
| 2012/0080954 A1* | 4/2012 | Gachon et al. | 307/80 |
| 2012/0274858 A1* | 11/2012 | Doi et al. | 348/723 |
| 2013/0050582 A1* | 2/2013 | Tran et al. | 348/724 |
| 2013/0128124 A1* | 5/2013 | Suzuki et al. | 348/723 |
| 2013/0148976 A1* | 6/2013 | Patel et al. | 398/116 |
| 2014/0355978 A1* | 12/2014 | Sakata et al. | 398/25 |

FOREIGN PATENT DOCUMENTS

| | | |
|---|---|---|
| JP | 2009-158223 | 7/2009 |
| JP | 2011-130297 | 6/2011 |
| WO | 2008/056719 | 5/2008 |

\* cited by examiner

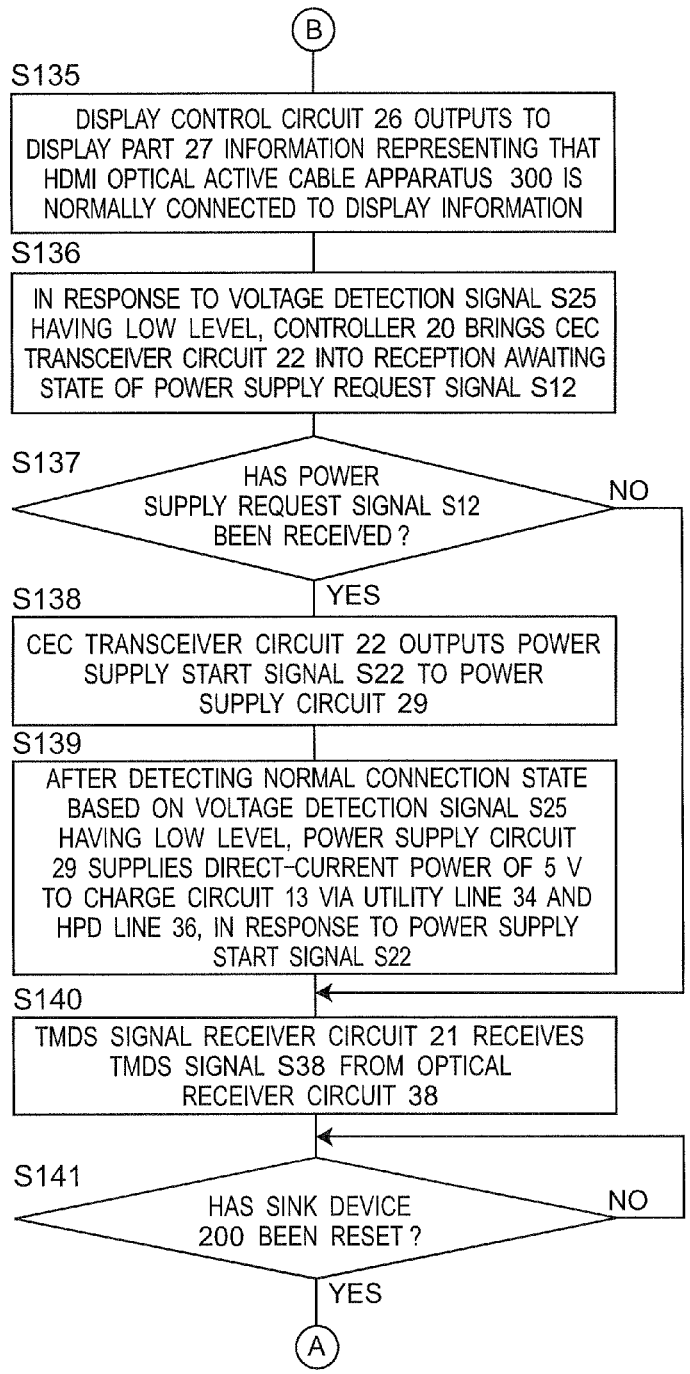

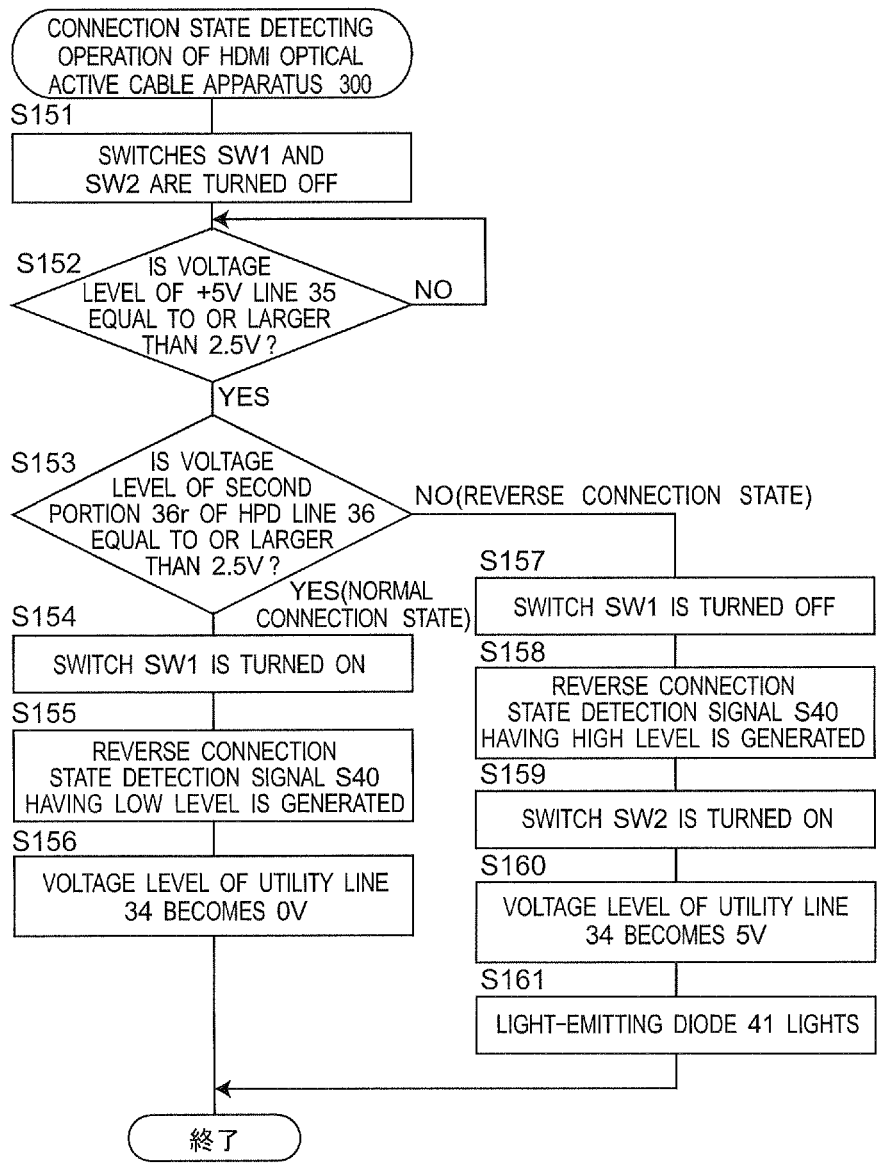

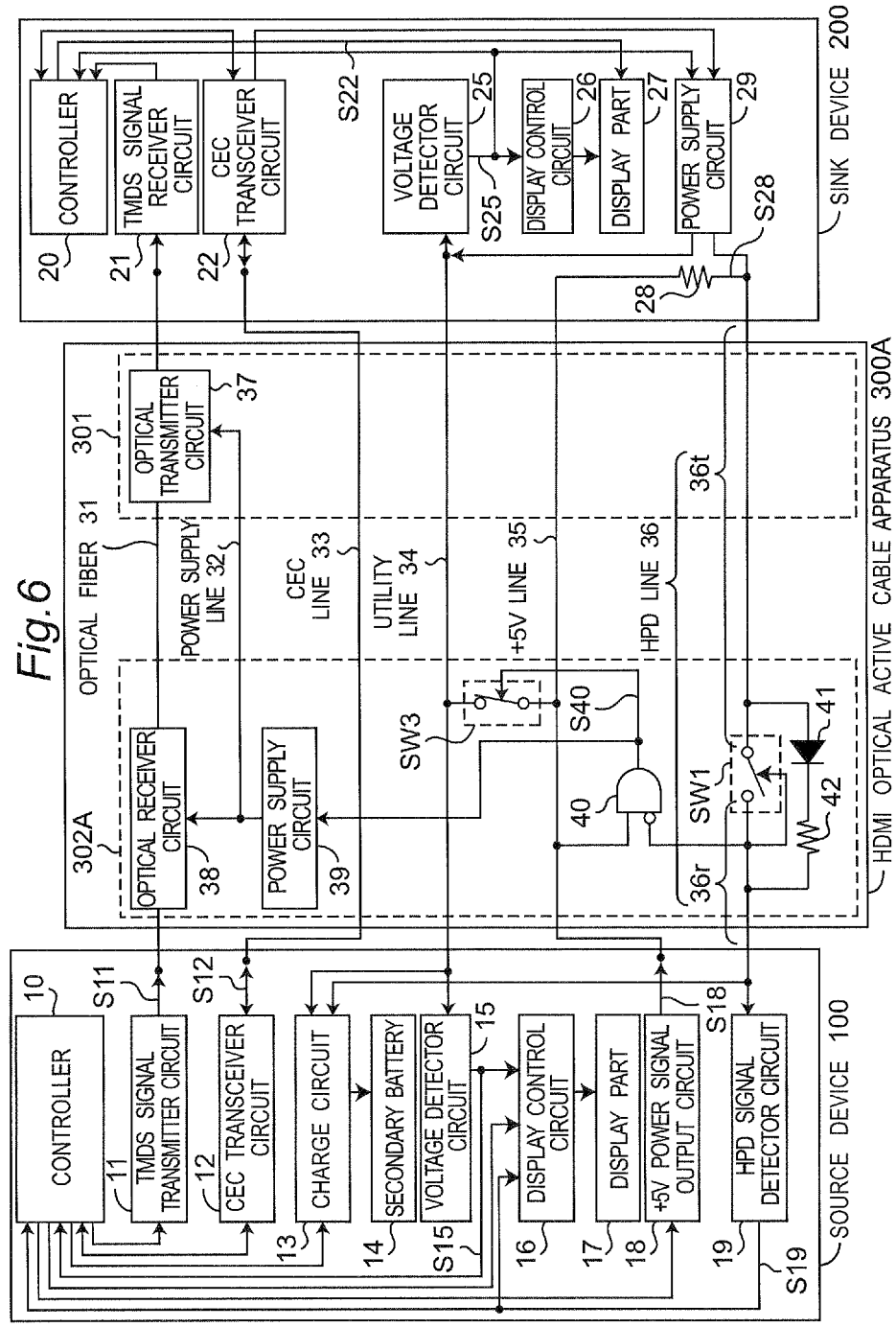

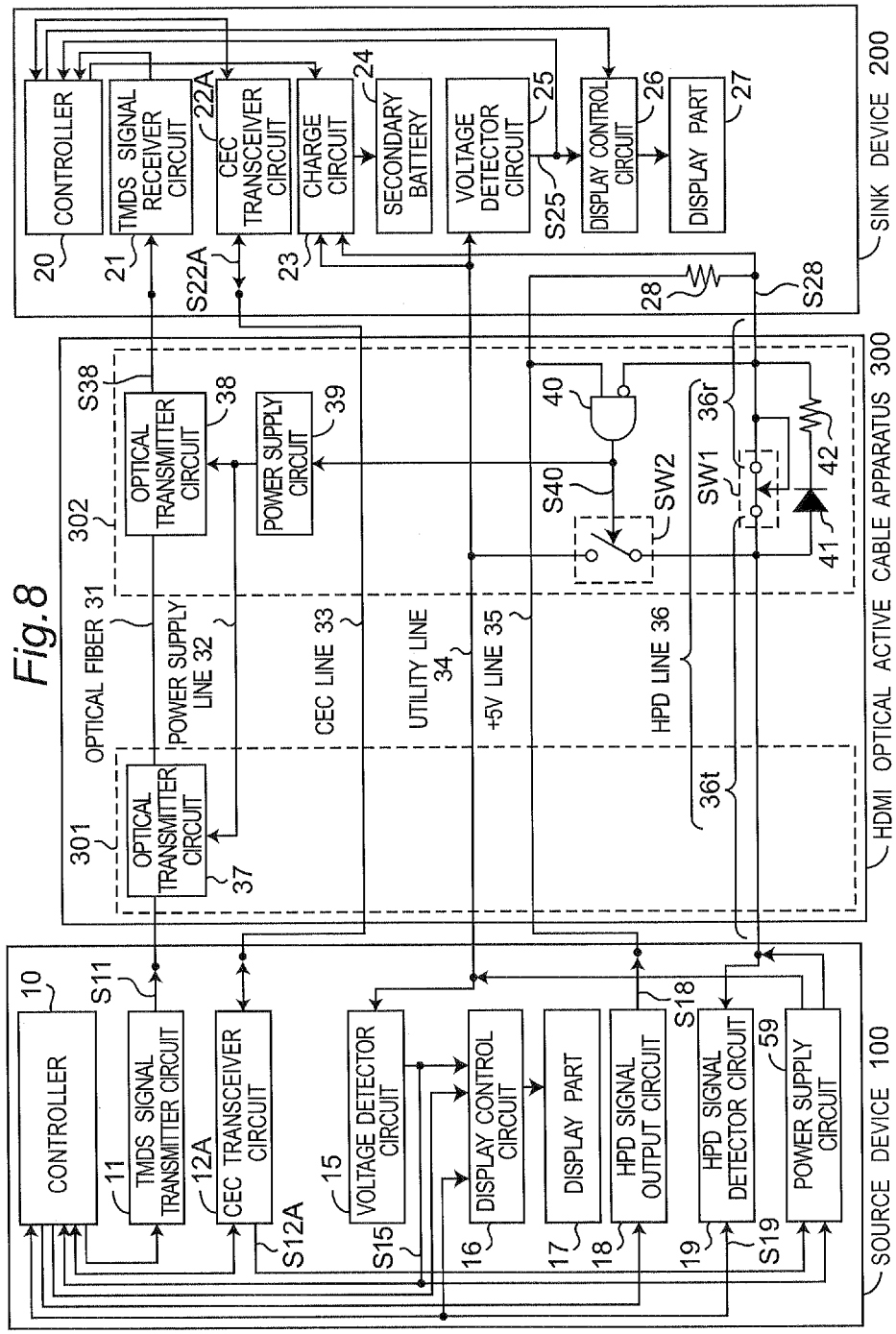

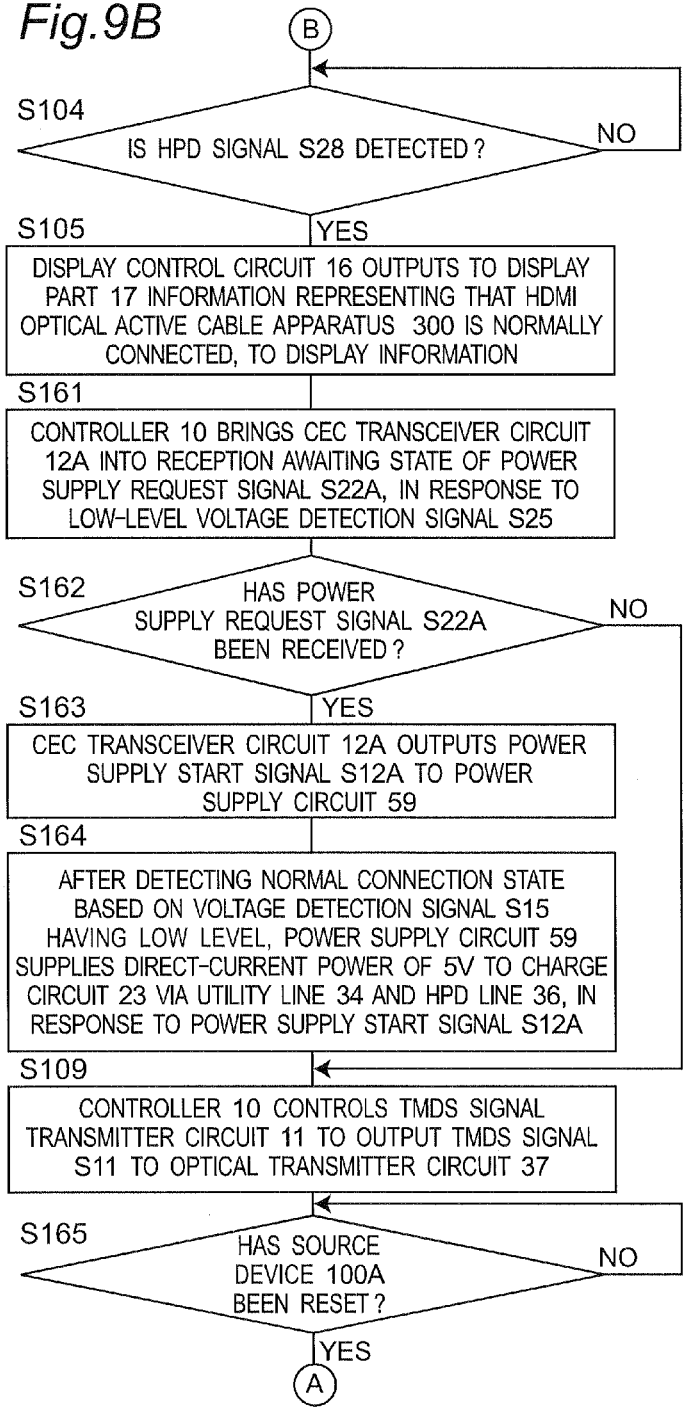

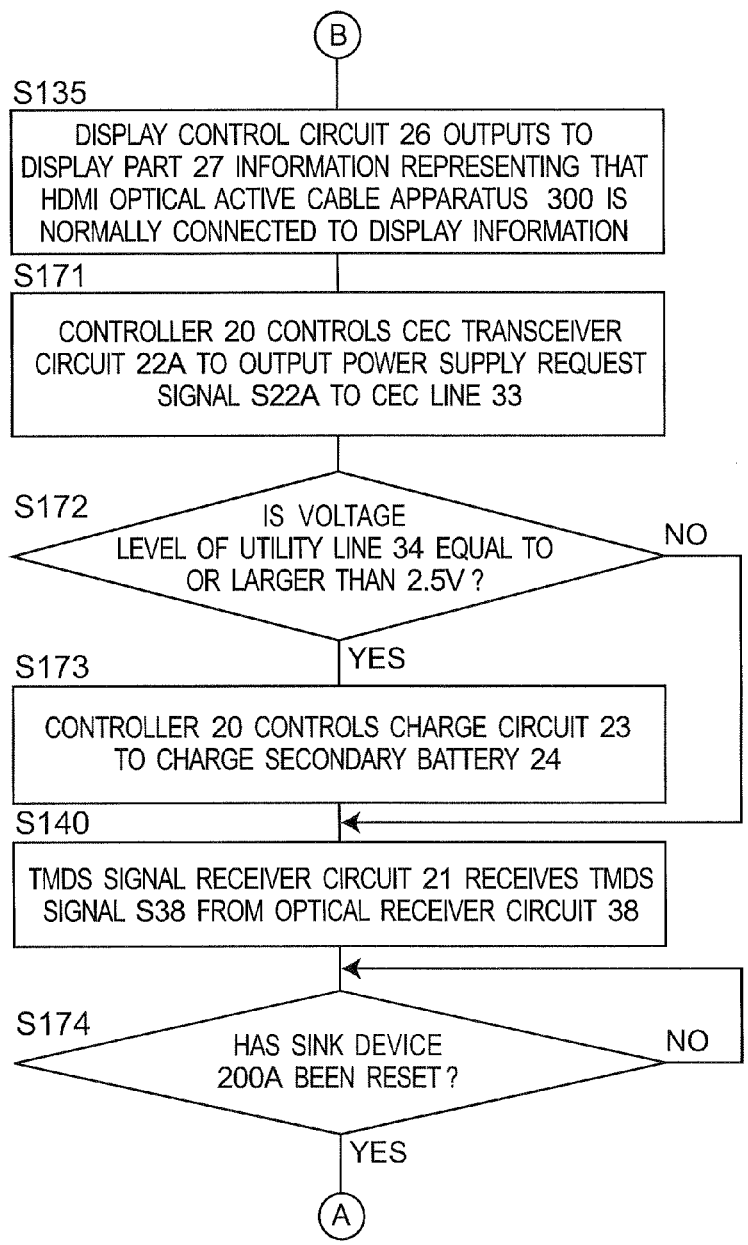

COMMUNICATION CABLE APPARATUS INCLUDING SWITCH TURNED OFF IN REVERSE CONNECTION STATE OF COMMUNICATION CABLE APPARATUS

CROSS-REFERENCE TO RELATED APPLICATIONS

This is a continuation application of International application No. PCT/JP2012/006442, with an international filing date of Oct. 5, 2012, which claims priority to Japanese patent application No. JP 2011-284892 as filed on Dec. 27, 2011, the content of which is incorporated herein by reference.

BACKGROUND

1. Technical Field

The present disclosure relates to a communication cable apparatus, a transmitter apparatus, a receiver apparatus, and a communication system. In particular, the present disclosure relates to a communication cable apparatus configured to transmit a data signal in a predetermined one direction from a transmitter apparatus to a receiver apparatus, the transmitter apparatus and the receiver apparatus connected to both ends of the communication cable apparatus, respectively, and a communication system that includes the transmitter apparatus, the communication cable apparatus and the receiver apparatus.

2. Description of the Related Art

When a transmitter apparatus and a receiver apparatus that are compliant to an interface standard such as an HDMI (High-Definition Multimedia Interface) standard for transmitting a data signal at high speed are wirely connected to each other, a communication cable apparatus including only passive devices can be used when a distance between the apparatuses is a short distance of equal to or shorter than 10 m. However, when the distance between the apparatuses becomes longer than 10 m, in order to improve a signal-to-noise ratio of a signal received by the receiver apparatus, an active cable or an optical active cable is used. In this case, the active cable includes a built-in active device of an amplifier device or the like. In addition, the optical active cable converts an electrical signal into an optical signal, transmits the optical signal, and thereafter, converts the optical signal into an electrical signal, and outputs a converted electrical signal. In the case of the communication cable apparatus configured to include only the passive devices, there is no restriction in a transmission direction of a signal, and therefore, it is not necessary to distinguish the transmitter apparatus and the receiver apparatus connected to connectors provided at both ends of the communication cable apparatus from each other. On the other hand, the active cable can transmit a signal only in one transmission direction, and therefore, it is necessary to clearly distinguish a connector to be connected to the transmitter apparatus and a connector to be connected to the receiver apparatus.

For example, when a source device and a sink device compliant to the HDMI standard are connected to each other by using an optical active cable, the optical active cable includes an optical fiber, a source device connector that includes an optical transmitter circuit for converting a video and audio signal from the source device into an optical signal and outputting the optical signal to the optical fiber, and a sink device connector that includes an optical receiver circuit for converting the optical signal from the optical fiber into a video and audio signal and outputting the video and audio signal to the sink device. Therefore, if an HDMI optical active cable is reversely connected between the source device and the sink device, the video and audio signal from the source device is disadvantageously outputted to the optical receiver circuit of the HDMI optical active cable, and the HDMI optical active cable does not normally operate. Therefore, the prior art HDMI optical active cable has been configured so that the source device connector and the sink device connector can be visually distinguished from each other.

International Publication No. WO 2008/056719 A1 is related to the present disclosure.

SUMMARY

Generally speaking, in the optical active cable, control signals such as an HPD (Hot Plug Detect) signal compliant to the HDMI standard other than the video and audio signal are transmitted via electric wires such as copper wires. Therefore, the control signals are correctly transmitted even when the optical active cable is reversely connected. As a result, the source device and the sink device operate in a manner similar to that when the HDMI optical active cable is correctly connected, and the source device disadvantageously outputs the video and audio signal to the optical receiver circuit of the sink device connector. As a result, the HDMI optical active cable has occasionally broken.

One non-limiting and exemplary embodiment provides a communication cable apparatus, a transmitter apparatus, a receiver apparatus and a communication system each capable of solving the above-described problems, and capable of preventing the breakdown of the communication cable apparatus even if the communication cable apparatus configured to transmit a data signal in a predetermined one direction from the transmitter apparatus to the receiver apparatus is reversely connected between the transmitter apparatus and the receiver apparatus.

In the first general aspect, the techniques disclosed here feature a communication cable apparatus configured to transmit a data signal from a transmitter apparatus to a receiver apparatus in a predetermined one direction via a first communication line. The communication cable apparatus includes:

a second communication line configured to transmit a first connection detection signal from the transmitter apparatus to the receiver apparatus;

a third communication line configured to transmit a second connection detection signal, which is outputted from the receiver apparatus in response to the first connection detection signal, to the transmitter apparatus;

a switch inserted in the third communication line; and a control circuit configured to turn on the switch in response to the second connection detection signal in such a normal connection state that the communication cable apparatus is connected between the transmitter apparatus and the receiver apparatus so that the data signal can be transmitted in the predetermined one direction from the transmitter apparatus to the receiver apparatus, and turn off the switch in such a reverse connection state that the communication cable apparatus is connected between the transmitter apparatus and the receiver apparatus in a direction reverse to the one direction.

In the second general aspect, the techniques disclosed here feature a transmitter apparatus for use in a communication system including the transmitter apparatus, a receiver apparatus, and a communication cable apparatus. The communication cable apparatus includes:

a first communication line configured to transmit a data signal in a predetermined one direction from the transmitter apparatus to the receiver apparatus;

a second communication line configured to transmit a first connection detection signal from the transmitter apparatus to the receiver apparatus;

a third communication line configured to transmit a second connection detection signal, which is outputted from the receiver apparatus in response to the first connection detection signal, to the transmitter apparatus;

a fourth communication line connected between the transmitter apparatus and receiver apparatus;

a switch inserted in the third communication line;

a control circuit configured to turn on the switch in response to the second connection detection signal in such a normal connection state that the communication cable apparatus is connected between the transmitter apparatus and the receiver apparatus so that the data signal can be transmitted in the predetermined one direction from the transmitter apparatus to the receiver apparatus, and turn off the switch in such a reverse connection state that the communication cable apparatus is connected between the transmitter apparatus and the receiver apparatus in a direction reverse to the one direction;

a gate circuit configured to output a connection state detection signal representing the normal connection state when the gate circuit detects the first connection detection signal and the second connection detection signal, and output a connection state detection signal representing the reverse connection state when the gate circuit detects the first connection detection signal and does not detect the second connection detection signal; and an output circuit configured to output a predetermined first voltage level to the fourth communication line in response to the connection state detection signal representing the normal connection state, and output a predetermined second voltage level to the fourth communication line in response to the connection state detection signal representing the reverse connection state.

The transmitter apparatus detects a voltage level of the fourth communication line, and detects the not mal connection state or the reverse connection state based on a detected voltage level.

In the third general aspect, the techniques disclosed here feature a receiver apparatus for use a communication system including a transmitter apparatus, the receiver apparatus and a communication cable apparatus. The communication cable apparatus includes:

a first communication line configured to transmit a data signal in a predetermined one direction from the transmitter apparatus to the receiver apparatus;

a second communication line configured to transmit a first connection detection signal from the transmitter apparatus to the receiver apparatus;

a third communication line configured to transmit a second connection detection signal, which is outputted from the receiver apparatus in response to a first connection detection signal, to the transmitter apparatus;

a fourth communication line connected between the transmitter apparatus and receiver apparatus;

a switch inserted in the third communication line;

a control circuit configured to turn on the switch in response to the second connection detection signal in such a normal connection state that the communication cable apparatus is connected between the transmitter apparatus and the receiver apparatus so that the data signal can be transmitted in the predetermined one direction from the transmitter apparatus to the receiver apparatus, and turn off the switch in such a reverse connection state that the communication cable apparatus is connected between the transmitter apparatus and the receiver apparatus in a direction reverse to the one direction;

a gate circuit configured to output a connection state detection signal representing the normal connection state when the gate circuit detects the first connection detection signal and the second connection detection signal, and output a connection state detection signal representing the reverse connection state when the gate circuit detects the first connection detection signal and does not detect the second connection detection signal; and an output circuit configured to output a predetermined first voltage level to the fourth communication line in response to the connection state detection signal representing the normal connection state, and output a predetermined second voltage level to the fourth communication line in response to the connection state detection signal representing the reverse connection state.

The receiver apparatus detects a voltage level of the fourth communication line, and detects the normal connection state or the reverse connection state based on a detected voltage level.

Since the communication cable apparatus of the first aspect of the present disclosure includes the above-described switch and the above-described control circuit, the breakdown of the communication cable apparatus can be prevented in the reverse connection state.

In addition, each of the transmitter apparatus of the second aspect of the present disclosure, the receiver apparatus of the third aspect of the present disclosure, and the communication system including the above-described communication cable apparatus, the transmitter apparatus and the receiver apparatus detects the voltage level of the fourth communication line, and detects the normal connection state or the reverse connection state based on a detected voltage level. Therefore, the breakdown of the communication cable apparatus can be prevented in the reverse connection state.

Additional benefits and advantages of the disclosed embodiments will be apparent from the specification and drawings. The benefits and/or advantages may be individually provided by the various embodiments and features of the specification and drawings of disclosure, and need not all be provided in order to obtain one or more of the same.

BRIEF DESCRIPTION OF THE DRAWINGS

These and other objects and features of the present disclosure will become clear from the following descriptions taken in conjunction with the embodiments thereof with reference to the accompanying drawings throughout which like parts are designated by like reference numerals, and in which:

FIG. 4B is a flow chart showing a second portion of the connection state detecting operation by the sink device 200 of FIG. 1;

FIG. 5 is a flow chart showing a connection state detecting operation of the HDMI optical active cable apparatus 300 of FIG. 1;

FIG. 6 is a block diagram showing a configuration of a communication system according to a second embodiment of the present disclosure, when an HDMI optical active cable apparatus 300A is reversely connected between the source device 100 and the sink device 200;

FIG. 8 is a block diagram showing a configuration of a communication system according to a fourth embodiment of the present disclosure, when the HDMI optical active cable apparatus 300 is correctly connected between a source device 100A and a sink device 200A;

FIG. 9B is a flow chart showing a second portion of the connection state detecting operation by the source device 100A of FIG. 8;

FIG. 10B is a flow chart showing a second portion of the connection state detecting operation by the sink device 200A of FIG. 8.

DETAILED DESCRIPTION

Figure 1:
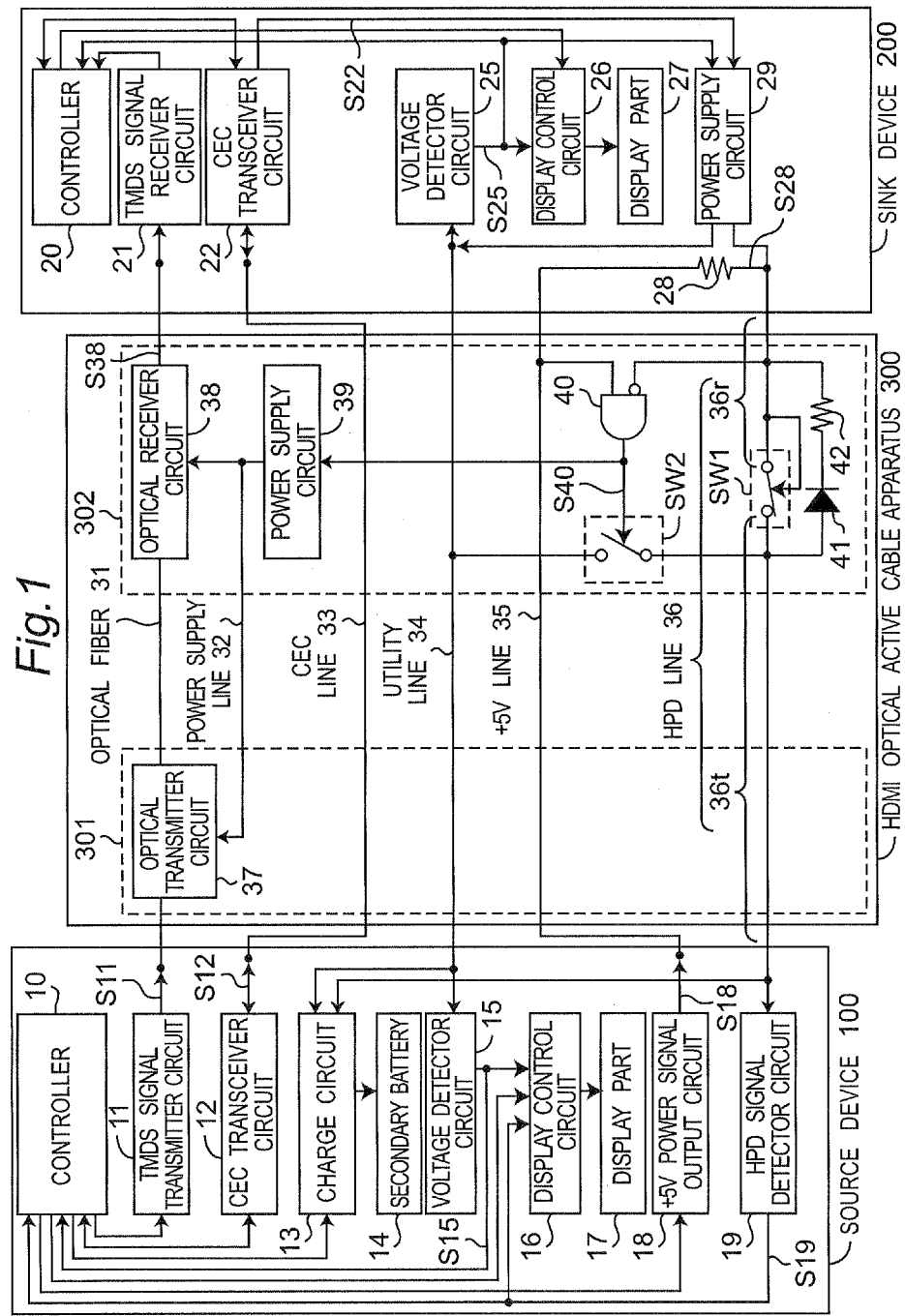
FIG. 1 is a block diagram showing a configuration of a communication system according to a first embodiment of the present disclosure, when an HDMI optical active cable apparatus 300 is correctly connected between a source device 100 and a sink device 200.

Embodiments of the present disclosure will be described hereinafter with reference to the drawings. In the embodiments, components similar to each other are denoted by the same reference numerals.

First Embodiment

Figure 2:
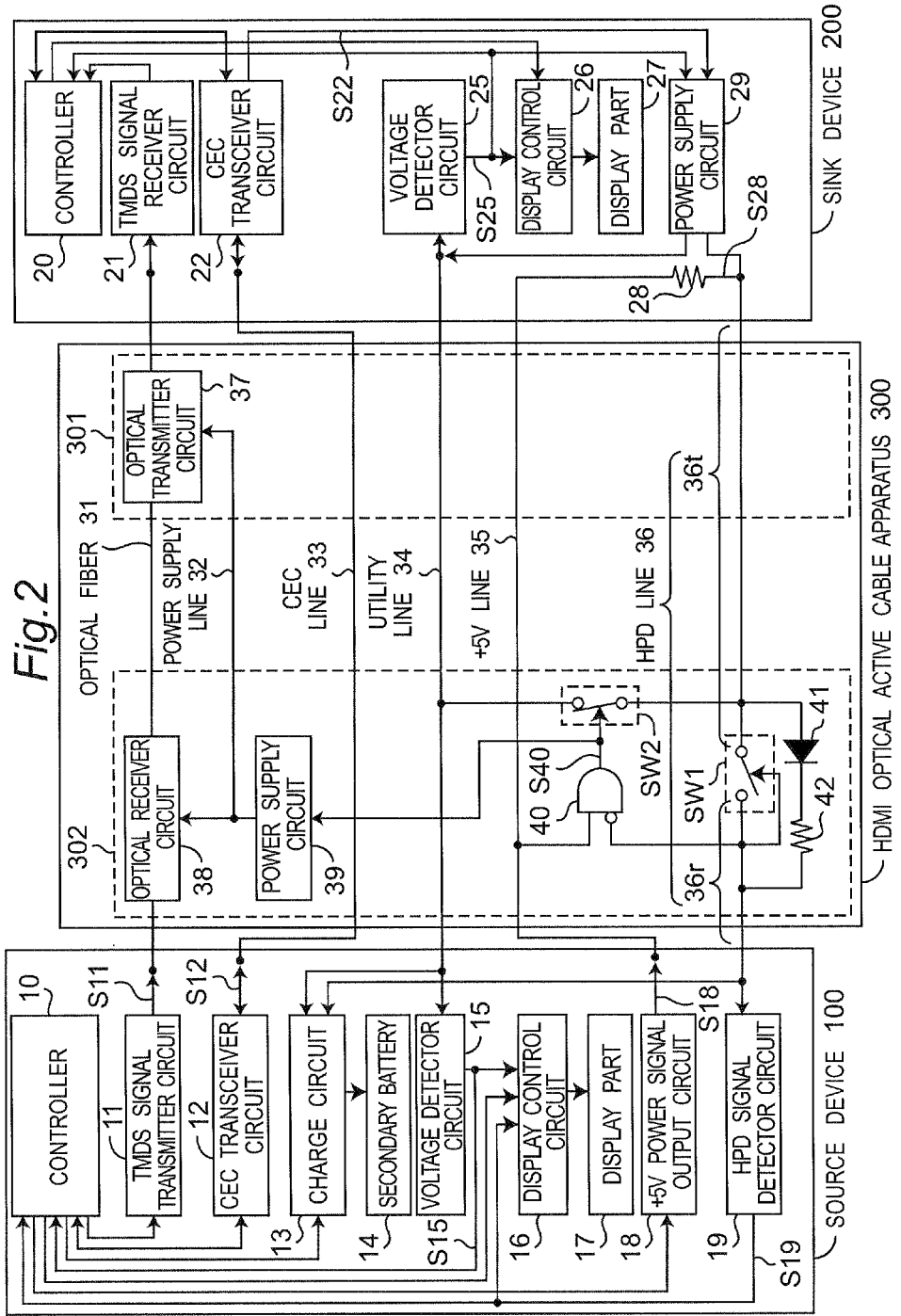
FIG. 2 is a block diagram showing the communication system of FIG. 1 when the HDMI optical active cable apparatus 300 is reversely connected between the source device 100 and the sink device 200.

FIG. 1 is a block diagram showing a configuration of a communication system according to the first embodiment of the present disclosure, when an HDMI optical active cable apparatus 300 is correctly connected between a source device 100 and a sink device 200. In addition, FIG. 2 is a block diagram showing the communication system of FIG. 1 when the HDMI optical active cable apparatus 300 is reversely connected between the source device 100 and the sink device 200. Referring to FIG. 1, the communication system of the present embodiment is configured to include the source device 100 of a transmitter apparatus, the sink device 200 of a receiver apparatus, and the HDMI optical active cable apparatus 300 of a communication cable apparatus for connecting the source device 100 with the sink device 200.

Referring to FIG. 1, the source device 100 is, for example, a portable telephone, and is configured to include a controller 10, a TMDS (Transition Minimized Differential Signaling) signal transmitter circuit 11, a CEC (Consumer Electronics Control) transceiver circuit 12, a charge circuit 13, a secondary battery 14, a voltage detector circuit 15, a display control circuit 16, a display part 17, a +5V power signal output circuit 18, and an HPD (Hot Plug Detect) signal detector circuit 19. In addition, the sink device 200 is, for example, a television broadcasting receiver apparatus, and is configured to include a controller 20, a TMDS signal receiver circuit 21, a CEC transceiver circuit 22, a voltage detector circuit 25, a display control circuit 26, a display part 27, a resistor 28, and a power supply circuit 29.

In addition, referring to FIG. 1, the HDMI optical active cable apparatus 300 is configured to include a source device connector 301, a sink device connector 302, an optical fiber 31 of a first communication line, a power supply line 32, a CEC line 33, a +5V line 35 of a second communication line, an HPD line 36 of a third communication line, and a utility line 34 of a fourth communication line. In this case, the source device connector 301 includes an optical transmitter circuit 37, and the sink device connector 302 is configured to include an optical receiver circuit 38, a power supply circuit 39, an AND gate 40, a light-emitting diode 41, a resistor 42, and switches SW1 and SW2.

It is noted that the power supply line 32, the CEC line 33, the utility line 34, the +5V line 35, and the HPD line 36 are each configured to include electric wires such as copper wires. In addition, the CEC line 33, the utility line 34, the +5V line 35, and the HPD line 36 are a CEC line, an utility line, a +5V line and an HPD line of a communication cable apparatus compliant to the HDMI standard, respectively.

In this case, as described in detail later, the source device 100 outputs a TMDS signal S11 of a data signal, and a +5V power signal S18 of a first connection detection signal. The sink device 200 outputs an HPD signal S28 of a second connection detection signal in response to the +5V power signal S18. Such a state that the source device connector 301 is connected to the source device 100, the sink device connector 302 is connected to the sink device 200, and the TMDS signal S11 is transmitted in one direction from the source device 100 to the sink device 200 via the optical fiber 31 is referred to as a normal connection state hereinafter. On the other hand such a state that the source device connector 301 is connected to the sink device 200, and the sink device connector 302 is connected to the source device 100 is referred to as a reverse connection state hereinafter.

In the source device 100 of FIG. 1, the controller 10 controls the TMDS signal transmitter circuit 11, the CEC transceiver circuit 12, the charge circuit 13, the display control circuit 16, and the +5V power signal output circuit 18. The TMDS signal transmitter circuit 11 generates a TMDS signal S11 that is the video and audio signal compliant to the HDMI standard, and outputs the same signal to the optical transmitter circuit 37 under the control of the controller 10. In addition, the CEC transceiver circuit 12 transmits control signals compliant to CEC to the sink device 200 via the CEC line 33, and receives control signals compliant to the CEC from the sink device 200 via the CEC line 33, under the control of the controller 10. In addition, the CEC transceiver circuit 12 generates a power supply request signal S12 described in detail later, and outputs the same signal to the CEC line 33 under the control of the controller 10. The charge circuit 13 charges the secondary battery 14 such as a lithium ion secondary battery with power supplied via the utility line 34 and the HPD line 36 under the control of the controller 10.

The voltage detector circuit 15 detects a voltage level of the utility line 34, generates a voltage detection signal S15 which has a high level and represents the reverse connection state when the voltage level of the utility line 34 is equal to or larger than a predetermined threshold value (e.g., 2.5 V), which is larger than 0 V and equal to or smaller than 5 V, and outputs the same signal to the display control circuit 16 and the controller 10. In addition, the voltage detector circuit 15 generates a voltage detection signal S15 which has a low level that represents the normal connection state when the voltage level of the utility line 34 is smaller than the above-described predetermined threshold value, and outputs the same signal to the display control circuit 16 and the controller 10. In response to the voltage detection signal S15 that represents the reverse connection state, the display control circuit 16 outputs information that represents the reverse connection state to the display part 17 such as a liquid crystal display apparatus to display the information. In addition, in response to the voltage detection signal S15 that represents the normal connection state and an HPD signal detection signal S19 (described in detail later) representing that the source device 100 has detected the HPD signal S28, the display control circuit 16 outputs information that represents the normal connection state to the display part 17 to display the information.

Further, the +5V power signal output circuit 18 generates a +5V power signal S18 compliant to the HDMI standard and outputs the same signal to the +5V line 35, by changing a voltage level of the +5V line 35 from 0 V to 5 V when connected to the +5V line 35. In addition, the HPD signal detector circuit 19 detects a voltage level of the HPD line 36, and outputs an HPD signal detection signal S19, which represents that the HPD signal S28 from the sink device 200 is being detected, to the controller 10 and the display control circuit 16, when the voltage level of the HPD line 36 is equal to or larger than a predetermined threshold value (e.g., 2.5 V) which is larger than 0 V and equal to or smaller than 5V. On the other hand, the HPD signal detector circuit 19 outputs an HPD signal detection signal S19, which represents that the HPD signal S28 is not being detected, to the controller 10, when the voltage level of the HPD line 36 is smaller than the above-described predetermined threshold value.

In the HDMI optical active cable apparatus 300 of FIG. 1, the optical transmitter circuit 37 and the optical receiver circuit 38 are communication circuits. The optical transmitter circuit 37 converts the TMDS signal S11 into an optical signal, and outputs the optical signal to the optical receiver circuit 38 via the optical fiber 31. The optical receiver circuit 38 converts the optical signal from the optical transmitter circuit 37 into a TMDS signal S38 which is the same as the TMDS signal S11, and outputs the TMDS signal S38 to the TMDS signal receiver circuit 21.

In addition, the HPD line 36 is divided into a first portion 36t that includes one end on the source device connector 301 side and a second portion 36r that includes another end on the sink device connector 302 side. The switch SW1 is inserted and is connected between the first portion 36t and the second portion 36r. In this case, the switch SW1 is turned on to connect the first portion 36t to the second portion 36r when the voltage level of the second portion 36r is equal to or larger than a predetermined threshold value (e.g., 2.5 V) that is larger than 0 V and equal to or smaller than 5 V. When the voltage level of the second portion 36r is smaller than the above-described predetermined threshold value, the switch SW1 is turned off to cut off the connection between the first portion 36t and the second portion 36r. It is noted that a circuit for outputting the voltage level of the second portion of the HPD line 36 to the switch SW1 operates as a control circuit to turn on and off the switch SW1 as described above. In addition, the switch SW1 is turned off in such an initial state that the source device 100 and the sink device 200 are not connected to the HDMI optical active cable apparatus 300.

In addition, a noninverted input terminal of the AND gate 40 of a gate circuit is connected to the +5V line 35, and an inversed input terminal of the AND gate 40 is connected to the second portion 36r of the HPD line 36. The AND gate 40 generates a connection state detection signal S40, which has the low level and represents the normal connection state, when the voltage level of the +5V line 35 is equal to or larger than a predetermined threshold value (e.g., 2.5 V) that is larger than 0 V and equal to or smaller than 5 V, and a voltage level of the second portion 36r is smaller than the above-described threshold value. In addition, the AND gate 40 generates a connection state detection signal S40, which has the high level and represents the reverse connection state, when the voltage level of the +5V line 35 is smaller than the above-described predetermined threshold value, and the voltage level of the second portion 36r is equal to or larger than the above-described predetermined threshold value. Namely, the AND gate 40 outputs the connection state detection signal S40 that represents the normal connection state, when the +5V power signal S18 is outputted to the +5V line 35 and the HPD signal S28 is outputted to the second portion 36r. On the other hand, the AND gate 40 outputs the connection state detection signal S40 that represents the reverse connection state, when the +5V power signal S18 is outputted to the +5V line 35 and the HPD signal S28 is not outputted to the second portion 36r.

The connection state detection signal S40 is outputted to the switch SW2 connected between the utility line 34 and the first portion 36t of the HPD line 36 and to the power supply circuit 39. The switch SW2 is turned on in response to the connection state detection signal S40, which has the high level and represents the reverse connection state. On the other hand, the switch SW2 is turned off in response to the connection state detection signal S40, which has the low level and represents the normal connection state. The switch SW2 and the first portion 36t of the HPD line 36 constitute an output circuit that changes the voltage level of the utility line 34 to a first voltage level (0 V) that represents the normal connection state or to a second voltage level (5 V) that represents the reverse connection state, in response to the connection state detection signal S40. It is noted that the switch SW2 is turned off in the initial state.

The power supply circuit 39 converts a direct-current power from an adaptor apparatus, which is connected to a commercial power source and is provided outside the communication system of FIG. 1, into a predetermined direct-current power of, for example, 3.3 V, in response to the connection state detection signal S40, which has the low level and represents the normal connection state, to supply the power to the optical receiver circuit 38 and to the optical transmitter circuit 37 via the power supply line 32. In addition, the power supply circuit 39 inhibits supplying the predetermined direct-current power of 3.3 V to the optical transmitter circuit 37 and the optical receiver circuit 38 in response to the connection state detection signal S40, which has the high level and represents the reverse connection state.

Further, the light-emitting diode 41 has an anode connected to the first portion 36t of the HPD line 36, and a cathode connected to the second portion 36r via the resistor 42. The light-emitting diode 41 emits light when the voltage level of the first portion 36t is larger than the voltage level of the second portion 36r to notify the reverse connection state.

In the sink device 200 of FIG. 1, the controller 20 controls the CEC transceiver circuit 22 and the display control circuit 26. The TMDS signal receiver circuit 21 outputs the TMDS signal S38 from the optical receiver circuit 38 to the controller 20. The CEC transceiver circuit 22 transmits control signals compliant to the CEC to the source device 100 via the CEC line 33, and receives control signals compliant to the CEC from the source device 100 via the CEC line 33, under the control of the controller 20. In addition, the CEC transceiver circuit 22 generates a power supply start signal S22 upon receiving the power supply request signal S12 described in detail later from the source device 100 via the CEC line 33, and outputs the same signal to the power supply circuit 29.

The voltage detector circuit 25 detects the voltage level of the utility line 34, generates a voltage detection signal S25, which has the high level and represents the reverse connection state, when the voltage level of the utility line 34 is equal to or larger than a predetermined threshold value (e.g., 2.5 V), which is larger than 0 V and equal to or smaller than 5 V, and outputs the same signal to the controller 20, the display control circuit 26 and the power supply circuit 29. In addition, the voltage detector circuit 25 generates a voltage detection signal S25, which has the low level and represents the normal connection state when the voltage level of the utility line 34 is smaller than the above-described predetermined threshold value, and outputs the same signal to the controller 20, the display control circuit 26 and the power supply circuit 29.

The display control circuit 26 outputs the information that represents the reverse connection state to the display part 27 such as the liquid crystal display apparatus to display the information, in response to the voltage detection signal S25 that represents the reverse connection state. On the other hand, the display control circuit 26 outputs the information that represents the normal connection state to the display part 27 to display the information, in response to the voltage detection signal S25 that represents the normal connection state. After detecting the normal connection state based on the voltage detection signal S25 having the low level, the power supply circuit 29 starts supplying the direct-current power of 5 V to the charge circuit 13 of the source device 100 via the utility line 34 and the HPD line 36, in response to the power supply start signal S22. In this case, the voltage of the utility line 34 is set to 5 V.

In addition, referring to FIG. 1, the resistor 28 has a resistance value of, for example, 1 kΩ. The resistor 28 has one end connected to the +5V line 35. In addition, another end of the resistor 28 is connected to the second portion 36r of the HPD line 36 in the normal connection state, and is connected to the first portion 36t of the HPD line 36 in the reverse connection state. The resistor 28 outputs the HPD signal S28 compliant to the HDMI standard from another end of the resistor 28 in response to the +5V power signal S18. It is noted that the voltage level of the HPD signal S28 becomes substantially 5 V when the +5V power signal S18 is outputted to the +5V line 35.

Figure 3A:
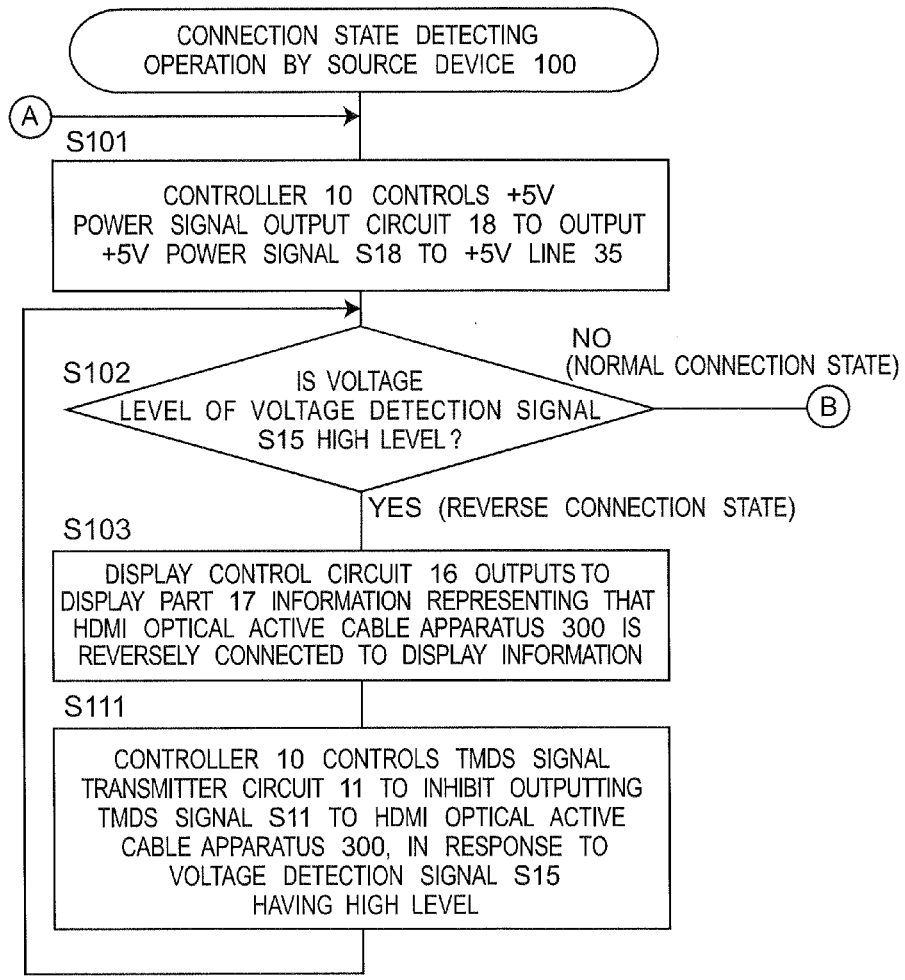
FIG. 3A is a flow chart showing a first portion of a connection state detecting operation by the source device 100 of FIG. 1.
Figure 3B:
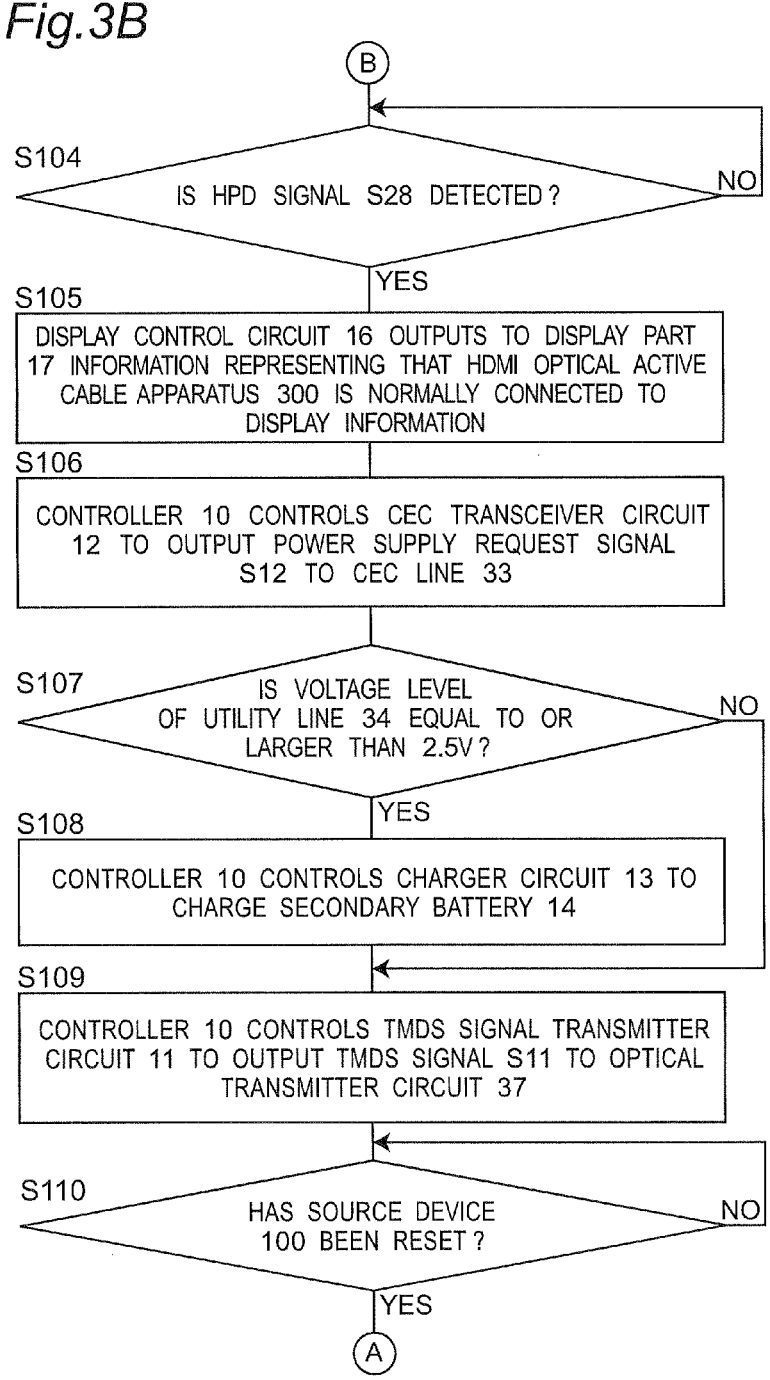
FIG. 3B is a flow chart showing a second portion of the connection state detecting operation by the source device 100 of FIG. 1.

FIGS. 3A and 3B are flow charts showing a connection state detecting operation by the source device 100 of FIG. 1. At step S101 of FIG. 3A, the controller 10 controls the +5V power signal output circuit 18 to output the +5V power signal S18 to the +5V line 35. In response to this, the +5V power signal output circuit 18 outputs the +5V power signal S18 to the +5V line 35. Next, at step S102, the display control circuit 16 determines whether or not the voltage level of the voltage detection signal S15 is the high level. If YES at step S102, it means the reverse connection state, and the display control circuit 16 outputs to the display part 17 information representing that the HDMI optical active cable apparatus 300 is reversely connected to display the information, at step S103. Further, at step S111, the controller 10 controls the TMDS signal transmitter circuit 11 to inhibit outputting the TMDS signal S11 to the HDMI optical active cable apparatus 300, in response to the voltage detection signal S15 having the high level, and the control flow returns to step S102.

If NO at step S102, it means the normal connection state, and the display control circuit 16 determines at step S104 of FIG. 3B whether or not the HPD signal S28 is detected based on the HPD signal detection signal S19. If NO at step S104, then the processing at step S104 is repetitively executed. On the other hand, if YES at step S104, then the display control circuit 16 outputs to the display part 17 information representing that the HDMI optical active cable apparatus 300 is normally connected to display the information, at step S105. Further, at step S106, the controller 10 controls the CEC transceiver circuit 12 to output the power supply request signal S12 for requesting power supply to the sink device 200, to the CEC line 33, in response to the voltage detection signal S15 representing the normal connection state and the HPD signal detection signal S19 representing that the HPD signal S28 has been detected.

Subsequently to step S106, the controller 10 determines at step S107 whether or not the voltage level of the utility line 34 is equal to or larger than 2.5 V by determining whether or not the voltage level of the voltage detection signal S15 is the high level. If YES at step S106, then the controller 10 controls the charge circuit 13 to charge the secondary battery 14 at step S108, and the control flow goes to step S109. In response to this, the charge circuit 13 charges the secondary battery 14 with the direct-current power of 5 V from the utility line 34 and the HPD line 36. Since the voltage level of the utility line 34 becomes equal to or larger than 2.5 V when the secondary battery 14 is charged, the voltage detection signal S15, which has the high level and represents the reverse connection state, is generated. Therefore, after the power supply request signal S12 is outputted, the controller 10 controls the display control circuit 16 to inhibit displaying the connection state based on the voltage detection signal S15.

On the other hand, if NO at step S107, then it is considered that the function of supplying power to the source device 100 is not normally operating in the sink device 200 or the HDMI optical active cable apparatus 300, and the control flow goes to step S109 without executing the process of step S108. At step S109, the controller 10 controls the TMDS signal transmitter circuit 11 to output the TMDS signal S11 to the optical transmitter circuit 37, and the control flow goes to step S110. It is noted that the output process of the TMDS signal S11 at step S109 is an output process compliant to the prior art HDMI standard. Subsequently to step S109, the controller 10 determines at step S110 whether or not the source device 100 has been reset. If YES at step S110, then the control flow returns to step S101 of FIG. 3A. On the other hand, if NO at step S110, then the process of step S110 is repetitively executed.

Figure 4A:
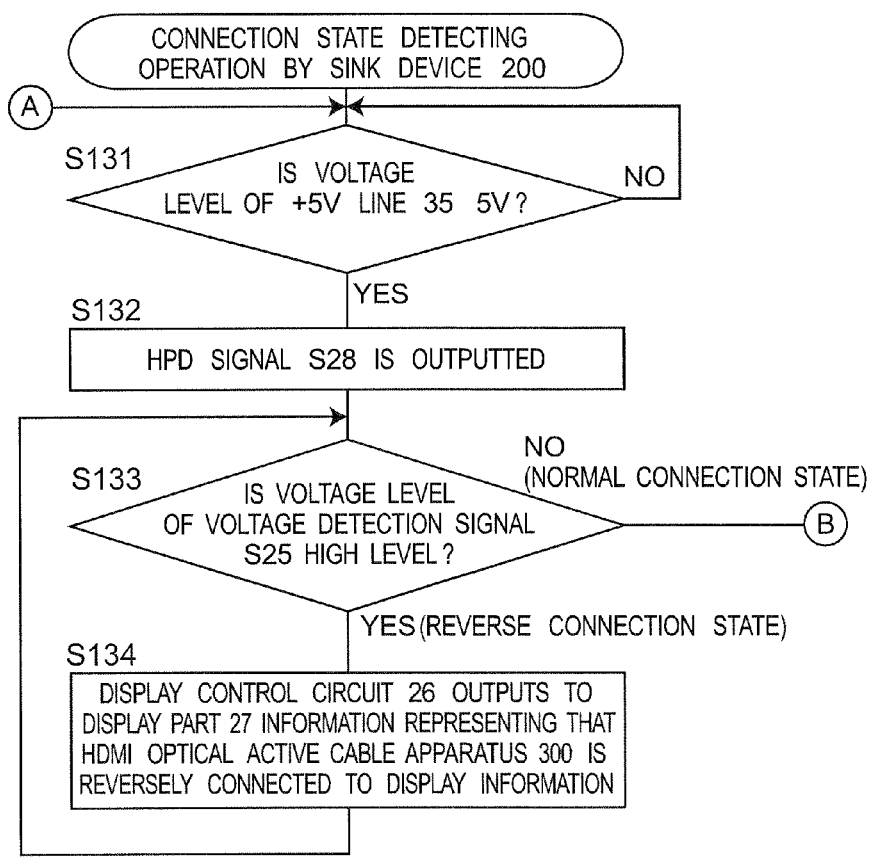
FIG. 4A is a flow chart showing a first portion of a connection state detecting operation by the sink device 200 of FIG. 1.

FIGS. 4A and 4B are flow charts showing a connection state detecting operation by the sink device 200 of FIG. 1. When the +5V power signal S18 is outputted and the voltage level of the +5V line 35 becomes 5 V at step S131 of FIG. 4A, the HPD signal S28 is outputted from the resistor S28 to the first portion 36t or the second portion 36r of the HPD line 36 at step S132. Then, the display control circuit 26 determines at step S133 whether or not the voltage level of the voltage detection signal S25 is the high level. If YES at step S133, then it means the reverse connection state, and the display control circuit 26 displays the information representing that the HDMI optical active cable apparatus 300 is reversely connected on the display part 27 at step S134, and the control flow returns to step S131.

If NO at step S133, then it means the normal connection state, and the display control circuit 26 displays the information representing that the HDMI optical active cable apparatus 300 is normally connected on the display part 27 at step S135 of FIG. 4B. Next, at step S136, the controller 20 brings the CEC transceiver circuit 22 into a reception awaiting state of the power supply request signal S12, in response to the voltage detection signal S25 having the low level. At this point of time, the power supply circuit 29 is not starting power supply to the source device 100. Next, the CEC transceiver circuit 22 determines at step S137 whether or not the power supply request signal S12 has been received via the CEC line 33. If YES at step S137, then the control flow goes to step S138. On the other hand, if NO at step S137, then the control flow goes to step S140. At step S138, the CEC transceiver circuit 22 outputs the power supply start signal S22 to the power supply circuit 29.

Further, at step S139, after detecting the normal connection state based on the voltage detection signal S25 having the low level, the power supply circuit 29 supplies the direct-current power of 5 V to the charge circuit 13 of the source device 100 via the utility line 34 and the HPD line 36, in response to the power supply start signal S22, and the control flow goes to step S140. Since the voltage level of the utility line 34 becomes equal to or larger than 2.5 V at step S139, the voltage detection signal S25, which has the high level and represents the reverse connection state, is generated. Therefore, after receiving the power supply request signal S12, the controller 20 controls the display control circuit 26 to inhibit displaying the connection state based on the voltage detection signal S25.

At step S140, the TMDS signal receiver circuit 21 receives the TMDS signal S38 from the optical receiver circuit 38, and outputs the same signal to the controller 20. It is noted that the receiving process of the TMDS signal S38 at step S140 is a receiving process compliant to the prior art HDMI standard. Next, the controller 20 determines at step S141 whether or not the sink device 200 has been reset. If YES at step S141, then the control flow returns to step S131 of FIG. 4A. On the other hand, if NO at step S141, then the process of step S141 is repetitively executed.

FIG. 5 is a flow chart showing a connection state detecting operation of the HDMI optical active cable apparatus 300 of FIG. 1. At the beginning, in the initial state at step S151, the switches SW1 and SW2 are off, and the switches SW1 and SW2 are off while the voltage level of the +5V line 35 is smaller than 2.5 V (when NO at step S152). Next, the switch SW1 is turned on (step S154) when the voltage level of the +5V line 35 becomes equal to or larger than 2.5 V (when YES at step S152) and the voltage level of the second portion 36r of the HPD line 36 becomes equal to or larger than 2.5 V (when YES at step S153). Further, the connection state detection signal S40 having the low level is generated (step S155). In response to this, the switch SW2 remains turned off, the voltage level of the utility line 34 becomes 0 V (step S156), and the reverse connection detecting operation ends.

In addition, referring to FIG. 5, the switch SW1 is turned off (step S157) when the voltage level of the +5V line 35 becomes equal to or larger than 2.5 V (when YES at step S152) and the voltage level of the second portion 36r of the HPD line 36 is smaller than 2.5 V (when NO at step S153). Further, the connection state detection signal S40 having the high level is generated (step S158). In response to this, the switch SW2 is turned on (step S159), and the voltage level of the utility line 34 becomes 5 V (step S160). Further, the light-emitting diode 41 lights (step 161), and the reverse connection detecting operation ends.

As described above, in the normal connection state, the connection state detection signal S40 having the low level is generated, the switch SW1 is turned on, the switch SW2 is turned off, and the light-emitting diode 41 does not light as shown in FIG. 1. Therefore, the HPD signal S28 is detected in the source device 100, the source device 100 determines that the sink device 200 has been connected, and the TMDS signal transmitter circuit 11 outputs the TMDS signal S11 to the HDMI optical active cable apparatus 300. In addition, the power supply circuit 29 supplies the direct-current power to the source device 100 via the utility line 34 and the HPD line 36. Further, the power supply circuit 39 outputs the direct-current power to the optical transmitter circuit 37 and the optical receiver circuit 38.

On the other hand, in the reverse connection state, the high level connection state detection signal S40 is generated, the switch SW1 is turned off, the switch SW2 is turned on, and the light-emitting diode 41 lights as shown in FIG. 2. Therefore, the HPD signal S28 is not detected in the source device 100, and the source device 100 determines that the sink device 200 is not connected, and the TMDS signal transmitter circuit 11 inhibits outputting the TMDS signal S11 to the HDMI optical active cable apparatus 300. In addition, since the CEC transceiver circuit 12 does not output the power supply request signal S12 to the sink device 200, power supply from the power supply circuit 29 to the source device 100 is not performed. Further, the power supply circuit 39 inhibits outputting the direct-current power to the optical transmitter circuit 37 and the optical receiver circuit 38.

As described above, the HDMI optical active cable apparatus 300 of the present embodiment has the switch SW1 inserted between the first portion 36t and the second portion 36r of the HPD line 36, and the control circuit. The control circuits turns on the switch SW1 in response to the HPD signal S28 in the case of the normal connection state, in which the HDMI optical active cable apparatus 300 is connected between the source device 100 and the sink device 200 while allowing the TMDS signal S11 to be transmitted in one direction from the source device 100 to the sink device 200. On the other hand, the control circuit turns off the switch SW1 in the case of the reverse connection state, in which the HDMI optical active cable apparatus 300 is connected between the source device 100 and the sink device 200 in the direction opposite from the above-described one direction. Therefore, according to the HDMI optical active cable apparatus 300 of the present embodiment, connection between the first portion 36t and the second portion 36r is cut off in the reverse connection state. Therefore, it is possible to prevent the TMDS signal S11 from being outputted to the HDMI optical active cable apparatus 300 via a link established between the source device 100 and the sink device 200. Therefore, the breakdown of the HDMI optical active cable apparatus 300 due to the reverse connection can be prevented.

In addition, according to the HDMI optical active cable apparatus 300 of the present embodiment, there is provided the AND gate 40. The AND gate 40 outputs the connection state detection signal S40 that represents the normal connection state, when the +5V power signal S18 and the HPD signal S28 are detected. On the other hand, the AND gate 40 outputs the connection state detection signal S40 that represents the reverse connection state, when the +5V power signal S18 is detected and the HPD signal S28 is not detected. Therefore, the reverse connection state can be detected more reliably than when the reverse connection state is detected only by the voltage level of the first portion 36r. Namely, since the voltage level of the +5V line 35 (i.e., whether or not the +5V power signal S18 is outputted) is monitored in addition to the voltage level of the first portion 36r of the HPD line 36, it can be detected that the source device 100 is connected to the HDMI optical active cable apparatus 300 and the connection state is the reverse connection state.

Further, according to the HDMI optical active cable apparatus 300 of the present embodiment, there is provided the output circuit that changes the voltage level of the utility line 34 according to the connection state by turning on or off the second switch SW2 in response to the connection state detection signal S40. Therefore, the reverse connection state can be detected based on the voltage level of the utility line 34 in the source device 100 and the sink device 200. In addition, the utility line 34 defined by the HDMI standard is used, and therefore, no signal line needs to be newly added to the prior art HDMI optical active cable compliant to the HDMI standard.

Still further, according to the HDMI optical active cable apparatus 300 of the present embodiment, the power supply circuit 39 inhibits supplying the power to the optical transmitter circuit 37 and the optical receiver circuit 38 in the reverse connection state. Therefore, the probability of the breakdown of the source device 100, the sink device 200 and the optical active cable apparatus 300 caused by the reverse connection can be reduced.

In addition, according to the HDMI optical active cable apparatus 300 of the present embodiment, the light-emitting diode 40 is lit in the reverse connection state, and therefore, it is possible to inform the user of the reverse connection state.

Further, according to the source device 100 of the present embodiment, the voltage level of the utility line 34 is detected, and the normal connection state or the reverse connection state can be detected based on a detected voltage level. Therefore, the TMDS signal S11 can be inhibited from being outputted when the HDMI optical active cable apparatus 300 is reversely connected, and the breakdown of the HDMI optical active cable apparatus 300 can be prevented. In addition, it is determined whether or not the HDMI optical active cable apparatus 300 is reversely connected based on the voltage level of the utility line 34, and the information representing the reverse connection state is outputted to and displayed on the display part 17. Therefore, it is possible to inform the user of the reverse connection state.

Still further, according to the sink device 200 of the present embodiment, the voltage level of the utility line 34 is detected, and the normal connection state or the reverse connection state can be detected based on a detected voltage level. In addition, it is determined whether or not the HDMI optical active cable apparatus 300 is reversely connected based on the voltage level of the utility line 34, and the information representing the reverse connection state is outputted to and displayed on the display part 27. Therefore, it is possible to inform the user of the reverse connection state.

In addition, according to the sink device 200 of the present embodiment, the power supply circuit 29 is provided, and therefore, the power can be supplied to the source device 100. In addition, the power supply circuit 29 supplies the power to the source device 100 by using the utility line 34, and therefore, the power can be supplied without newly adding a signal line to the prior art HDMI optical active cable compliant to the HDMI standard. Further, after detecting the normal connection state based on the voltage detection signal S25 having the low level, the power supply circuit 29 supplies the direct-current power of 5 V to the charge circuit 13 of the source device 100. Therefore, the connection state detecting operation of the HDMI optical active cable apparatus 300 and the power supply operation to the source device 100 can be sequentially performed by using the utility line 34. Further, even in a case where the voltage level used for detecting the connection state (connection direction) and the voltage level when the power is supplied are the same as each other in the utility line 34, the connection state detecting operation and the power supply operation can be made compatible.

When the prior art HDMI optical active cable is reversely connected between a source device and a sink device compliant to the prior art HDMI standard, the user can recognize the trouble only by such a phenomenon that no image is displayed on the sink device such as a monitor apparatus, and is unable to specify the place where the trouble is occurring among the source device, the sink device and the HDMI optical active cable. According to the present embodiment, the user can recognize that the HDMI optical active cable apparatus 300 is connected in the reverse direction by the display on the display part 27, the state of the light-emitting diode 41 or the display on the display part 17.

The power supply circuit 39, the AND gate 40, the light-emitting diode 41, the resistor 42 and the switches SW1 and SW2 are provided for the sink device connector 302 in the above-described embodiment, however, the present disclosure is not limited to this, and they may be provided for the source device connector 301.

Second Embodiment

FIG. 6 is a block diagram showing a configuration of a communication system according to the second embodiment of the present disclosure, when an HDMI optical active cable apparatus 300A is reversely connected between the source device 100 and the sink device 200. The communication system of FIG. 6 is different from the communication system of the first embodiment only in a point that the HDMI optical active cable apparatus 300A is provided instead of the HDMI optical active cable apparatus 300. Only differences between the present embodiment and the first embodiment are described hereinafter.

Referring to FIG. 6, the HDMI optical active cable apparatus 300A is different from the HDMI optical active cable apparatus 300 only in a point that a sink device connector 302A is provided instead of the sink device connector 302. The sink device connector 302A has a switch SW3 connected between the utility line 34 and the +5V line 35 instead of the switch SW2 as compared with the sink device connector 302.

In this case, the switch SW3 is turned off in response to the connection state detection signal S40, which has the low level and represents the normal connection state. On the other hand, the switch SW3 is turned on in response to the connection state detection signal S40, which has the high level and represents the reverse connection state. Therefore, in the normal connection state, the switch SW3 is turned off, and the voltage level of the utility line 34 becomes 0 V. In the reverse connection state, the switch SW3 is turned on, and the voltage level of the utility line 34 becomes 5 V. The switch SW3 and the +5V line 35 constitute an output circuit that changes the voltage level of the utility line 34 to 0 V that represents the normal connection state or 5 V that represents the reverse connection state, in response to the connection state detection signal S40.

The HDMI optical active cable apparatus 300A of the present embodiment exhibits advantageous effects similar to those of the optical active cable apparatus 300 of the first embodiment. It is noted that, in the case of the present embodiment, it is impossible to distinguish such a state that the source device 100 is connected to the HDMI optical active cable apparatus 300A and the sink device 200 is not connected, from the reverse connection state, based on the voltage level of the utility line 34.

The power supply circuit 39, the AND gate 40, the light-emitting diode 41, the resistor 42 and the switches SW1 and SW2 are provided for the sink device connector 302A in the present embodiment, however, the present disclosure is not limited to this, and they may be provided for the source device connector 301.

Third Embodiment

Figure 7:
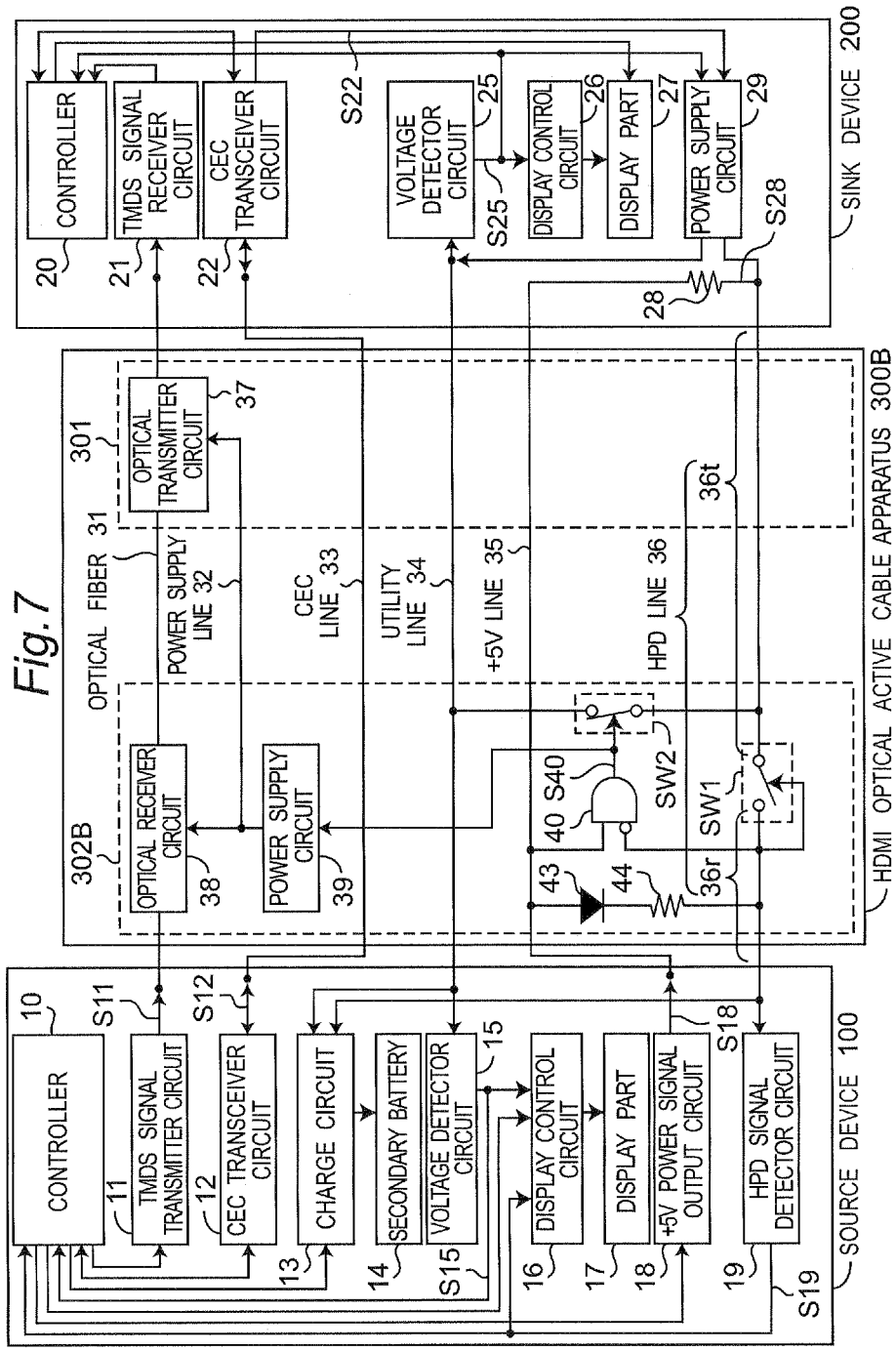
FIG. 7 is a block diagram showing a configuration of a communication system according to a third embodiment of the present disclosure, when an HDMI optical active cable apparatus 300B is reversely connected between the source device 100 and the sink device 200.

FIG. 7 is a block diagram showing a configuration of a communication system according to the third embodiment of the present disclosure, when an HDMI optical active cable apparatus 300B is reversely connected between the source device 100 and the sink device 200. The communication system of FIG. 7 is different from the communication system of the first embodiment only in a point that an HDMI optical active cable apparatus 300B is provided instead of the HDMI optical active cable apparatus 300. Only differences between the present embodiment and the first embodiment are described hereinafter.

Referring to FIG. 7, the HDMI optical active cable apparatus 300B is different from the HDMI optical active cable apparatus 300 only in a point that a sink device connector 302B is provided instead of the sink device connector 302. The sink device connector 302B is different from the sink device connector 302 only in a point that a light-emitting diode 43 and a resistor 44 are provided instead of the light-emitting diode 41 and the resistor 42. In this case, the light-emitting diode 43 has an anode connected to the +5V line 35, and a cathode connected to the second portion 36r of the HPD line 36 via the resistor 44. Therefore, in the normal connection state, the voltage level of the +5V line 35 and the voltage level of the second portion 36r of the HPD line 36 become substantially equal to each other, and the light-emitting diode 43 does not light. In the reverse connection state, the voltage level of the +5V line 35 is 5 V and the voltage level of the second portion 36r of the HPD line 36 become 0 V, and therefore, the light-emitting diode 43 lights.

The HDMI optical active cable apparatus 300B of the present embodiment exhibits advantageous effects similar to those of the optical active cable apparatus 300 of the first embodiment. It is noted that, when the cable length of the HDMI optical active cable apparatus 300B becomes longer than a predetermined value, a voltage drop occurs due to the conductor resistance of the HPD line 36, and the voltage level of the second portion 36r of the HPD line 36 disadvantageously becomes smaller than 5 V. This leads to a possibility that the light-emitting diode 43 erroneously lights even in the normal connection state. Therefore, it is proper to use the HDMI optical active cable apparatus 300B of the present embodiment when a distance between the source device 100 and the sink device 200 is equal to or shorter than the above-described predetermined value.

The power supply circuit 39, the AND gate 40, the light-emitting diode 43, the resistor 44 and the switches SW1 and SW2 are provided for the sink device connector 302B in the present embodiment, however the present disclosure is not limited to this, and they may be provided for the source device connector 301.

Fourth Embodiment

FIG. 8 is a block diagram showing a configuration of a communication system according to the fourth embodiment of the present disclosure, when the HDMI optical active cable apparatus 300 is correctly connected between a source device 100A and a sink device 200A. Referring to FIG. 8, the communication system of the present embodiment is configured to include the source device 100A of a transmitter apparatus, the sink device 200A of a receiver apparatus, and the HDMI optical active cable apparatus 300 of a communication cable apparatus for connecting the source device 100A with the sink device 200A. Referring to FIG. 8, the HDMI optical active cable apparatus 300 operates in a manner similar to that of the HDMI optical active cable apparatus 300 of FIG. 1, and therefore, no description is provided therefor.

Referring to FIG. 8, the source device 100A is, for example, a Blu-ray Disc recorder, and is configured to include a controller 10, a TMDS signal transmitter circuit 11, a CEC transceiver circuit 12A, a voltage detector circuit 15, a display control circuit 16, a display part 17, a +5V power signal output circuit 18, an HPD signal detector circuit 19, and a power supply circuit 59. In addition, the sink device 200A is, for example, a television broadcasting receiver apparatus, and is configured to include a controller 20, a TMDS signal receiver circuit 21, a CEC transceiver circuit 22A, a charge circuit 23, a secondary battery 24, a voltage detector circuit 25, a display control circuit 26, a display part 27, and a resistor 28.

In this case, as described in detail later, the source device 100A outputs a TMDS signal S11 of a data signal and a +5V power signal S18 of a first connection detection signal, and the sink device 200A outputs an HPD signal S28 of a second connection detection signal in response to the +5V power signal S18. In the present embodiment, the source device connector 301 is connected to the source device 100A, and the sink device connector 302 is connected to the sink device 200A. Such a state that the TMDS signal S11 is transmitted in one direction from the source device 100A to the sink device 200A via the optical fiber 31 is referred to as the normal connection state, and such a state that the source device connector 301 is connected to the sink device 200A and the sink device connector 302 is connected to the source device 100A is referred to as the reverse connection state.

In the source device 100A of FIG. 8, the controller 10 controls the TMDS signal transmitter circuit 11, the CEC transceiver circuit 12A, the display control circuit 16, the +5V power signal output circuit 18, and the power supply circuit 59. The TMDS signal transmitter circuit 11 operates in a manner similar to that of the TMDS signal transmitter circuit 11 of FIG. 1. In addition, the CEC transceiver circuit 12A transmits control signals compliant to the CEC to the source device 100A via the CEC line 33, and receives control signals compliant to the CEC from the source device 100A via the CEC line 33, under the control of the controller 10. In addition, the CEC transceiver circuit 12A generates a power supply start signal S12A and outputs the same signal to the power supply circuit 59 upon receiving a power supply request signal S22A described in detail later from the sink device 200A via the CEC line 33.

The voltage detector circuit 15 generates a voltage detection signal S15 in a manner similar to that of voltage detector circuit 15 of FIG. 1, and outputs the same signal to the controller 10, the display control circuit 16, and the power supply circuit 59. The control circuit 16, the display part 17, the +5V power signal output circuit 18 and the HPD signal detector circuit 19 operate in manners similar to those of the display control circuit 16, the display part 17, the +5V power signal output circuit 18 and the HPD signal detector circuit 19 of FIG. 1, respectively.

After detecting the normal connection state based on a voltage detection signal S25 having the low level, the power supply circuit 59 starts supplying the direct-current power of 5 V to the charge circuit 23 of the sink device 200A via the utility line 34 and the HPD line 36 in response to the power supply start signal S12A. At this time, the voltage of the utility line 34 is set to 5 V.

In the sink device 200A of FIG. 8, the controller 20 controls the CEC transceiver circuit 22A and the display control circuit 26. The TMDS signal receiver circuit 21 operates in a manner similar to that of the TMDS signal receiver circuit 21 of FIG. 1. In addition, the CEC transceiver circuit 22A transmits control signals compliant to the CEC to the sink device 200A via the CEC line 33 under the control of the controller 20, and receives control signals compliant to the CEC from the sink device 200A via the CEC line 33 under the control of the controller 20. In addition, the CEC transceiver circuit 22A generates the power supply request signal S22A described in detail later, and outputs the same signal to the CEC line 33. The charge circuit 23 charges the secondary battery 24 such as a lithium ion secondary battery with power supplied via the utility line 34 and the HPD line 36 under the control of the controller 20.

The voltage detector circuit 25 generates a voltage detection signal S25, and outputs the same signal to the controller 20 and the display control circuit 26 in a manner similar to that of the voltage detector circuit 25 of FIG. 1. In addition, the display control circuit 26, the display part 27 and the resistor 28 operate in manners similar to those of the display control circuit 26, the display part 27 and the resistor 28 of FIG. 1, respectively.

Figure 9A:
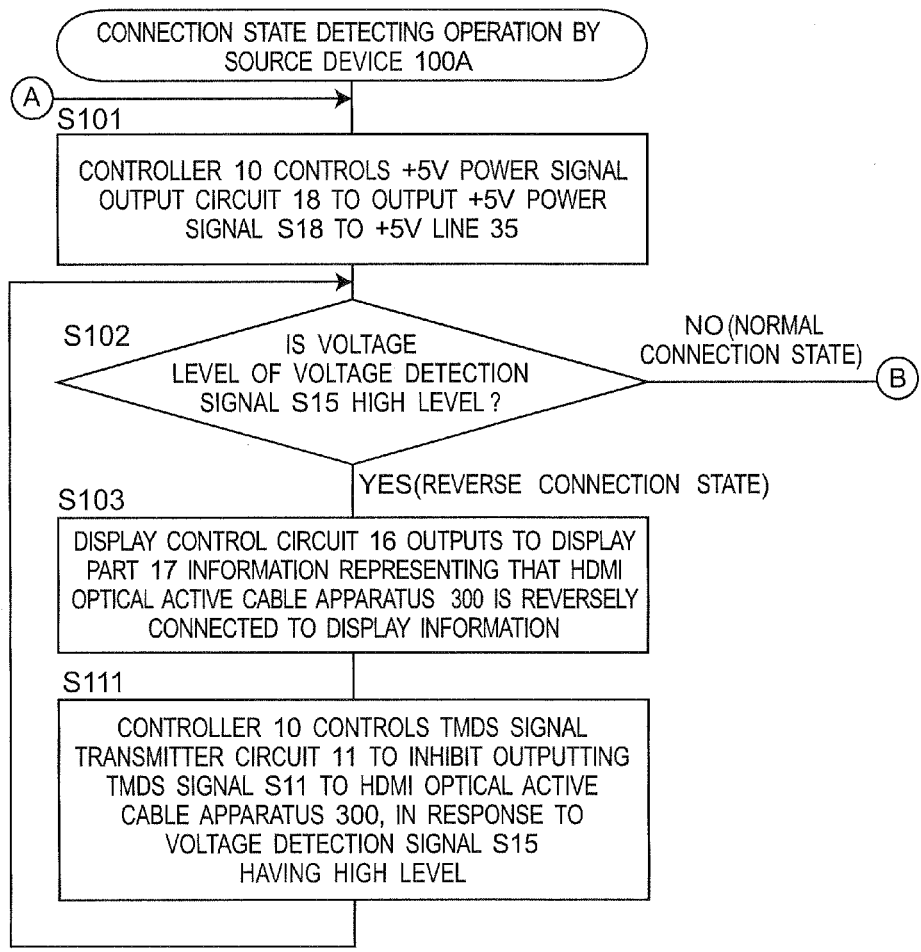
FIG. 9A is a flow chart showing a first portion of a connection state detecting operation by the source device 100A of FIG. 8.

FIGS. 9A and 9B are flow charts showing a connection state detecting operation by the source device 100A of FIG. 8. As compared with the connection state detecting operation of FIGS. 3A and 3B, in the connection state detecting operation of FIGS. 9A and 9B, steps S106 to S108 of FIG. 3B are replaced with steps S161 to S164 of FIG. 9B, and step S110 of FIG. 3B is replaced with step S165 of FIG. 9B. Differences between the connection state detecting operation of FIGS. 3A and 3B and the connection state detecting operation of FIGS. 9A and 9B are only described hereinafter.

Referring to FIG. 9B, subsequently to step S105, the controller 10 brings the CEC transceiver circuit 12A into a reception awaiting state of the power supply request signal S22A, in response to the voltage detection signal S15 having the low level at step S161. At this point of time, the power supply circuit 59 does not start power supply to the sink device 200A. Next, the CEC transceiver circuit 12A determines at step S162 whether or not the receive power supply request signal S22A has been received via the CEC line 33. If YES at step S162, then the control flow goes to step S163. On the other hand, if NO at step S162, then the control flow goes to step S109. At step S163, the CEC transceiver circuit 12A outputs the power supply start signal S12A to the power supply circuit 59.

Further, at step S164, after detecting the normal connection state based on the voltage detection signal S15 having the low level, the power supply circuit 59 supplies the direct-current power of 5 V to the charge circuit 23 of the sink device 200A via the utility line 34 and the HPD line 36, in response to the power supply start signal S12A, and the control flow goes to step S109. Since the voltage level of the utility line 34 becomes equal to or larger than 2.5 V at step S164, the voltage detection signal S15, which has the high level and represents the reverse connection state, is generated. Therefore, after receiving the power supply request signal S22A, the controller 10 controls the display control circuit 16 to inhibit displaying the connection state based on the voltage detection signal S15.

At step S109, the controller 10 controls the TMDS signal transmitter circuit 11 to output the TMDS signal S11 to the optical transmitter circuit 37, and the control flow goes to step S165. It is noted that the output process of the TMDS signal S11 at step S109 is an output process compliant to the prior art HDMI standard. Subsequently to step S109, the controller 10 determines at step S165 whether or not the source device 100A has been reset. If YES at step S165, then the control flow returns to step S101 of FIG. 9A. On the other hand, if NO at step S165, then the process of step S165 is repetitively executed.

Figure 10A:
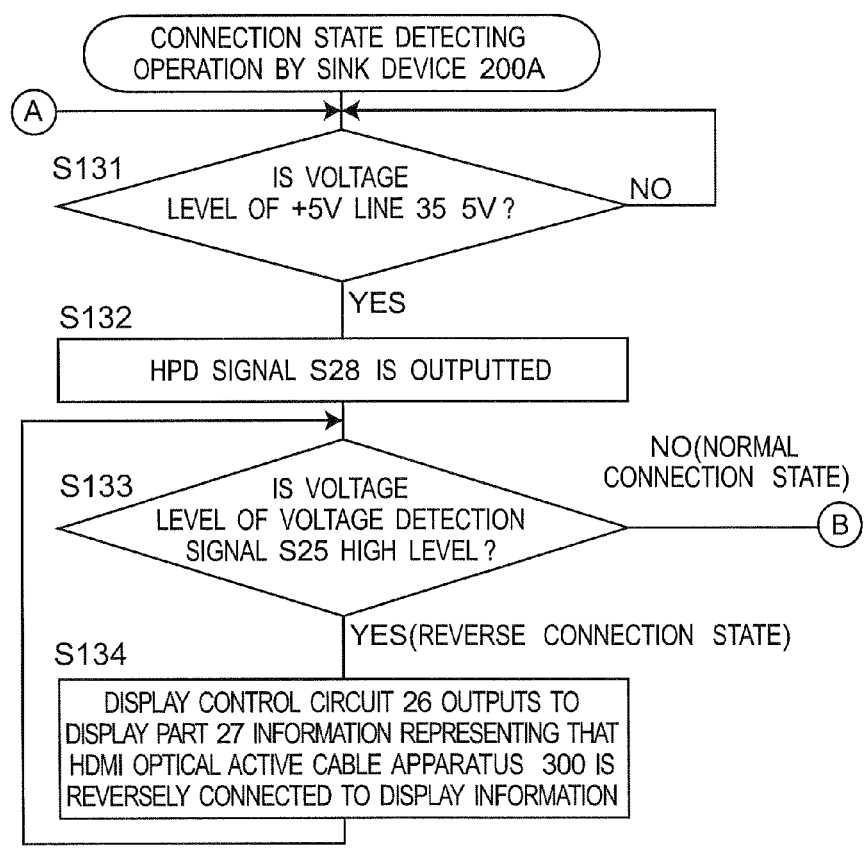
FIG. 10A is a flow chart showing a first portion of a connection state detecting operation by the sink device 200A of FIG. 8.

FIGS. 10A and 10B are flow charts showing a connection state detecting operation by the sink device 200A of FIG. 8. As compared with the connection state detecting operation of FIGS. 4A and 4B, in the connection state detecting operation of FIGS. 10A and 10B, steps S136 to S139 of FIG. 4B are replaced with steps S171 to S173 of FIG. 10B, and step S141 of FIG. 4B is replaced with step S174 of FIG. 10B. Differences between the connection state detecting operation of FIGS. 4A and 4B and the connection state detecting operation of FIGS. 10A and 19B are described hereinafter.

Referring to FIG. 10B, subsequently to step S135, the controller 20 controls the CEC transceiver circuit 22A to output the power supply request signal S22A for requesting the source device 100A to supply power to the CEC line 33, in response to the voltage detection signal S25 that represents the normal connection state, at step S171.

Subsequently to step S171, the controller 20 determines at step S172 whether or not the voltage level of the utility line 34 is equal to or larger than 2.5 V by determining whether or not the voltage level of the voltage detection signal S25 is the high level. If YES at step S172, then the controller 20 controls the charge circuit 23 to charge the secondary battery 24 at step S173, and the control flow goes to step S140. In response to this, the charge circuit 23 charges the secondary battery 24 with the direct-current power of 5 V from the utility line 34 and the HPD line 36. Since the voltage level of the utility line 34 becomes equal to or larger than 2.5 V when the secondary battery 24 is charged, the voltage detection signal S25, which had the high level and represents the reverse connection state, is generated. Therefore, after the power supply request signal S22A is outputted, the controller 20 controls the display control circuit 26 to inhibit displaying the connection state based on the voltage detection signal S25.

If NO at step S172, then it is considered that the function of supplying power to the sink device 200A is not normally operating in the source device 100A or the HDMI optical active cable apparatus 300, and the control flow goes to step S140 without executing the process of step S173.

At step S140, the TMDS signal receiver circuit 21 receives the TMDS signal S38 from the optical receiver circuit 38, and outputs the same signal to the controller 20. It is noted that the receiving process of the TMDS signal S38 at step S140 is a receiving process compliant to the prior art HDMI standard. Next, at step S174, the controller 20 determines whether or not the sink device 200A has been reset. If YES at step S174, then the control flow returns to step S131 of FIG. 10A. On the other hand, if NO at step S174, then the process of step S174 is repetitively executed.

According to the source device 100A of the present embodiment, the voltage level of the utility line 34 is detected, and the normal connection state or the reverse connection state can be detected based on a detected voltage level. Therefore, the TMDS signal S11 can be inhibited from being outputted when the HDMI optical active cable apparatus 300 is reversely connected, and the breakdown of the HDMI optical active cable apparatus 300 can be prevented. In addition, it is determined whether or not the HDMI optical active cable apparatus 300 is reversely connected based on the voltage level of the utility line 34, and the information that represents the reverse connection state is outputted to the display part 17 to display the information. Therefore, it is possible to inform the user of the reverse connection state.

In addition, according to the source device 100A of the present embodiment has the power supply circuit 59, and therefore, power can be supplied to the sink device 200A. In addition, the power supply circuit 59 supplies the power to the sink device 200A by using the utility line 34, and therefore, the power can be supplied without newly adding a signal line to the prior art HDMI optical active cable compliant to the HDMI standard. Further, after detecting the normal connection state based on the voltage detection signal S15 having the low level, the power supply circuit 59 supplies the direct-current power of 5 V to the charge circuit 23 of the sink device 200A. Therefore, the connection state detecting operation of the HDMI optical active cable apparatus 300 and the power supply operation to the sink device 200A can be sequentially performed by using the utility line 34. Further, even in the case where the voltage level used for detecting the connection state (connection direction) and the voltage level when the power is supplied are the same as each other at the utility line 34, the connection state detection operation and the power supply operation can be made compatible.

Still further, according to the sink device 200A of the present embodiment, the voltage level of the utility line 34 is detected, and the normal connection state or the reverse connection state can be detected based on a detected voltage level. Therefore, it can be determined whether or not the HDMI optical active cable apparatus 300 is reversely connected. In addition, it is determined whether or not the HDMI optical active cable apparatus 300 is reversely connected based on the voltage level of the utility line 34, and the information representing the reverse connection state is outputted to the display part 27 to display the information. Therefore, it is possible to inform the user of the reverse connection state.

According to the present embodiment, the user can recognize that the HDMI optical active cable apparatus 300 is connected in the reverse direction by the display on the display part 27, the light-emitting diode 41 or the display on the display part 17.

It is noted that the HDMI optical active cable apparatus 300A or 300B may be used instead of the HDMI optical active cable apparatus 300 in the present embodiment.

In each of the above-described embodiments, the display control circuit 16 outputs the information, which represents the normal connection state, to the display part 17 to display the information in response to the voltage detection signal S15, which has the low level and represents the normal connection state, and the HPD signal detection signal S19 representing that the source device 100 has detected the HPD signal S28, however, the present disclosure is not limited to this. The display control circuit 16 may output the information that represents the normal connection state to the display part 17 to display the information based only on the voltage detection signal S15, which has the low level and represents the normal connection state. In addition, the display control circuit 16 outputs the information that represents the normal connection state to the display part 17 to display the information in the normal connection state, however, the present disclosure is not limited to this. Nothing may be displayed on the display part 17 in the normal connection state.

In addition, in each of the above-described embodiments, the display control circuit 26 outputs the information that represents the normal connection state to the display part 27 to display the information, in response to the voltage detection signal S25, which has the low level and represents the normal connection state, however, the present disclosure is not limited to this. The display control circuit 26 may display nothing on the display part 27 in response to the voltage detection signal S25, which has the low level and represents the normal connection state.

Further, in each of the above-described embodiments, the connection state of the HDMI optical active cable apparatus 300, 300A or 300B is determined based on the voltage level of the utility line 34, however, the present disclosure is not limited to this. Another signal line may be utilized instead of the utility line 34. In this case, the switch SW2 is connected between the first portion 36t of the HPD line 36 and the above-described another signal line.

In addition, in each of the above-described embodiments, the direct-current power of 5 V is supplied by using the utility line 34 and the HPD line 36, however, the present disclosure is not limited to this. Another signal line of the HDMI optical active cable apparatus 300, 300A or 300B may be used as a power supply line. In addition, the supplied power voltage is not limited to 5 V.

In addition, in each of the above-described embodiments, although the reverse connection state is notified by lighting the light-emitting diode 41 or 43, however, the present disclosure is not limited to this. The reverse connection state may be notified by using other notify apparatus such as a warning sound by a buzzer or the like, based on a voltage level difference between the first portion 36t and the second portion 36r of the HPD line 36, a voltage level difference between the +5V line 35 and the second portion of the HPD line 36 or the connection state detection signal S40.

Further, in each of the above-described embodiments, the reverse connection state is notified by using the display parts 27 and 17, however, the present disclosure is not limited to this. The reverse connection state may be notified by using other notify apparatus such as a warning sound by a buzzer or the like in the source device 100 or 100A and the sink device 200 or 200A.

In addition, in each of the above-described embodiments, the reverse connection state is notified in the source device 100 or 100A, the sink device 200 or 200A, the HDMI optical active cables 300, 300A or 300B, however, the present disclosure is not limited to this. The reverse connection state only needs to be notified at at least one of the source device, the sink device and the HDMI optical active cable, which constitute the communication system.

Still further, in each of the above-described embodiments, the source device 100 or 100A transmits the TMDS signal S11 compliant to the HDMI standard to the sink device 200 or 200A, the present disclosure is not limited to this. A predetermined data signal other than the TMDS signal S11 may be transmitted.

Further, in each of the above-described embodiments, the transmitter apparatus and the receiver apparatus of the present disclosure have been described by taking the source device 100 and the sink device 200 or the source device 100A and the sink device 200A for example, however, the present disclosure is not limited to this. The present disclosure can be applied to a transmitter apparatus configured to output a predetermined data signal and a predetermined first connection detection signal, and a receiver apparatus configured to output a predetermined second connection detection signal in response to the predetermined first connection detection signal.

Still further, in each of the above-described embodiments, although the communication cable apparatus of the present disclosure has been described by taking the HDMI optical active cables 300, 300A and 300B for example, however, the present disclosure is not limited to this. The present disclosure can be applied to a communication cable apparatus having a first communication line configured to transmit a data signal in a predetermined one direction from the transmitter apparatus to the receiver apparatus, a second communication line configured to transmit the first connection detection signal from the transmitter apparatus to the receiver apparatus, and a third communication line configured to transmit the second connection detection signal outputted from the receiver apparatus in response to the first connection detection signal to the transmitter apparatus. For example, the communication cable apparatus of the present disclosure can be utilized for a communication cable apparatus having a transmitter circuit that executes predetermined processing on the data signal from the transmitter apparatus and outputs a resultant signal to the first communication line, and a receiver circuit that executes predetermined processing such as an amplification process on a data signal transmitted via the first communication line and outputs a resultant signal to the receiver apparatus.

In addition, the present disclosure can be applied to a communication system having a transmitter apparatus configured to output a predetermined data signal and a predetermined first connection detection signal, a receiver apparatus configured to output a predetermined second connection detection signal in response to the first connection detection signal, and a communication cable apparatus configured to transmit the data signal from the transmitter apparatus to the receiver apparatus in a predetermined one direction via the first communication line. Although the present disclosure has been described by taking the communication system compliant to the HDMI standard for example in each of the above-described embodiments, the present disclosure can be applied to communication systems compliant to the standards such as the DVI (Digital Visual Interface) standard, the display port (DisplayPort) standard, and the USB (Universal Serial Bus) standard.

As described above, the communication cable apparatus according to the first aspect is a communication cable apparatus configured to transmit a data signal from a transmitter apparatus to a receiver apparatus in a predetermined one direction via a first communication line. The communication cable apparatus is characterized by including:

a second communication line configured to transmit a first connection detection signal from the transmitter apparatus to the receiver apparatus;

a third communication line configured to transmit a second connection detection signal, which is outputted from the receiver apparatus in response to the first connection detection signal, to the transmitter apparatus;

a switch inserted in the third communication line; and a control circuit configured to turn on the switch in response to the second connection detection signal in such a normal connection state that the communication cable apparatus is connected between the transmitter apparatus and the receiver apparatus so that the data signal can be transmitted in the predetermined one direction from the transmitter apparatus to the receiver apparatus, and turn off the switch in such a reverse connection state that the communication cable apparatus is connected between the transmitter apparatus and the receiver apparatus in a direction reverse to the one direction.

Therefore, since the third communication line is cut off in the reverse connection state, the breakdown of the communication cable apparatus can be prevented in the reverse connection state.

The communication cable apparatus according to the second aspect is the communication cable apparatus of the first aspect characterized by further including a gate circuit configured to output a connection state detection signal representing the normal connection state when the gate circuit detects the first connection detection signal and the second connection detection signal, and output a connection state detection signal representing the reverse connection state when the gate circuit detects the first connection detection signal and does not detect the second connection detection signal.

Therefore, since the connection state detection signal is outputted, the transmitter apparatus and the receiver apparatus can detect that the communication cable apparatus is reversely connected based on the connection state detection signal, for example.

The communication cable apparatus according to the third aspect is the communication cable apparatus of the second aspect characterized by including:

a fourth communication line connected between the transmitter apparatus and receiver apparatus; and an output circuit configured to output a predetermined first voltage level to the fourth communication line in response to the connection state detection signal representing the normal connection state, and output a predetermined second voltage level to the fourth communication line in response to the connection state detection signal representing the reverse connection state.

Therefore, in the transmitter apparatus and the receiver apparatus, the reverse connection state can be detected based on the voltage level of the fourth communication line.

The communication cable apparatus according to the fourth aspect is the communication cable apparatus of the second or third aspect characterized by further including a first power supply circuit configured to supply power to a communication circuit of the communication cable apparatus in response to the connection state detection signal representing the normal connection state, and inhibit supplying the power to the communication cable apparatus in response to the connection state detection signal representing the reverse connection state.

Therefore, it is possible to reduce the probability of the breakdown of the transmitter apparatus, the receiver apparatus and the communication cable apparatus caused by the reverse connection.

The communication cable apparatus of the fifth aspect is the communication cable apparatus according to any one of the first to fourth aspects characterized by further including a notify apparatus configured to notify the reverse connection state.

Therefore, it is possible to inform the user of the reverse connection state.

The communication cable apparatus according to the sixth aspect is the communication cable apparatus according to any one of the first to fifth aspects characterized in that the fourth communication line is a utility line of a communication cable apparatus compliant to the HDMI standard.

Therefore, no signal line needs to be newly added to the prior art HDMI optical active cable compliant to the HDMI standard.

The transmitter apparatus according to the seventh aspect is a transmitter apparatus for use in a communication system that includes the transmitter apparatus, a receiver apparatus, and a communication cable apparatus. The communication cable apparatus includes:

a first communication line configured to transmit a data signal in a predetermined one direction from the transmitter apparatus to the receiver apparatus;

a second communication line configured to transmit a first connection detection signal from the transmitter apparatus to the receiver apparatus;

a third communication line configured to transmit a second connection detection signal, which is outputted from the receiver apparatus in response to the first connection detection signal, to the transmitter apparatus;

a fourth communication line connected between the transmitter apparatus and receiver apparatus;

a switch inserted in the third communication line;

a control circuit configured to turn on the switch in response to the second connection detection signal in such a normal connection state that the communication cable apparatus is connected between the transmitter apparatus and the receiver apparatus so that the data signal can be transmitted in the predetermined one direction from the transmitter apparatus to the receiver apparatus, and turn off the switch in such a reverse connection state that the communication cable apparatus is connected between the transmitter apparatus and the receiver apparatus in a direction reverse to the one direction;

a gate circuit configured to output a connection state detection signal representing the normal connection state when the gate circuit detects the first connection detection signal and the second connection detection signal, and output a connection state detection signal representing the reverse connection state when the gate circuit detects the first connection detection signal and does not detect the second connection detection signal; and an output circuit configured to output a predetermined first voltage level to the fourth communication line in response to the connection state detection signal representing the normal connection state, and output a predetermined second voltage level to the fourth communication line in response to the connection state detection signal representing the reverse connection state.

In addition, the transmitter apparatus detects a voltage level of the fourth communication line, and detects the nom al connection state or the reverse connection state based on a detected voltage level.

Therefore, since the reverse connection state can be detected, the breakdown of the communication cable apparatus can be prevented in the reverse connection state.

The transmitter apparatus according to the eighth aspect is the transmitter apparatus of the seventh aspect characterized by further including a second notify apparatus configured to notify the reverse connection state.

Therefore, it is possible to inform the user of the reverse connection state.

The transmitter apparatus according to the ninth aspect is the transmitter apparatus according to the seventh or eighth aspect characterized in that the communication cable apparatus includes a power supply line, and the transmitter apparatus further includes a second power supply circuit configured to supply power to the receiver apparatus via the power supply line.

Therefore, the power can be supplied to the receiver apparatus via the communication cable apparatus.

The transmitter apparatus according to the tenth aspect is the transmitter apparatus of the ninth aspect characterized in that the transmitter apparatus start supplying power to the receiver apparatus by the second power supply circuit, after detecting the normal connection state.

Therefore, the breakdown of the receiver apparatus can be prevented.

The transmitter apparatus according to the eleventh aspect is the transmitter apparatus of the ninth or tenth aspect characterized in that the power supply line includes a utility line of a communication cable apparatus compliant to an HDMI standard.

Therefore, power can be supplied to the receiver apparatus without newly adding a signal line to the prior art HDMI optical active cable compliant to the HDMI standard.

The receiver apparatus according to the twelfth aspect is a receiver apparatus for use a communication system including a transmitter apparatus. The communication cable apparatus includes:

a first communication line configured to transmit a data signal in a predetermined one direction from the transmitter apparatus to the receiver apparatus;

a second communication line configured to transmit a first connection detection signal from the transmitter apparatus to the receiver apparatus;

a third communication line configured to transmit a second connection detection signal, which is outputted from the receiver apparatus in response to a first connection detection signal, to the transmitter apparatus;

a fourth communication line connected between the transmitter apparatus and receiver apparatus;

a switch inserted in the third communication line;

a control circuit configured to turn on the switch in response to the second connection detection signal in such a normal connection state that the communication cable apparatus is connected between the transmitter apparatus and the receiver apparatus so that the data signal can be transmitted in the predetermined one direction from the transmitter apparatus to the receiver apparatus, and turn off the switch in such a reverse connection state that the communication cable apparatus is connected between the transmitter apparatus and the receiver apparatus in a direction reverse to the one direction;

a gate circuit configured to output a connection state detection signal representing the normal connection state when the gate circuit detects the first connection detection signal and the second connection detection signal, and output a connection state detection signal representing the reverse connection state when the gate circuit detects the first connection detection signal and does not detect the second connection detection signal; and an output circuit configured to output a predetermined first voltage level to the fourth communication line in response to the connection state detection signal representing the normal connection state, and output a predetermined second voltage level to the fourth communication line in response to the connection state detection signal representing the reverse connection state.

In addition, the receiver apparatus detects a voltage level of the fourth communication line, and detects the normal connection state or the reverse connection state based on a detected voltage level.

Therefore, since the reverse connection state can be detected, the breakdown of the communication cable apparatus can be prevented in the reverse connection state.

The receiver apparatus according to the thirteenth aspect is the receiver apparatus of the twelfth aspect characterized by further including a third notify apparatus configured to notify the reverse connection state.

Therefore, it is possible to inform the user of the reverse connection state.

The receiver apparatus according to the fourteenth aspect is the receiver apparatus of the twelfth or thirteenth aspect characterized in that the communication cable apparatus includes a power supply line, and the receiver apparatus further includes a third power supply circuit that supplies power to the transmitter apparatus via the power supply line.

Therefore, the power can be supplied to the transmitter apparatus via the communication cable apparatus.

The receiver apparatus according to the fifteenth aspect is the receiver apparatus of the fourteenth aspect characterized in that the receiver apparatus start supplying power, to the transmitter apparatus by the third power supply circuit, after detecting the normal connection state.

Therefore, the breakdown of the transmitter apparatus can be prevented.

The receiver apparatus according to the sixteenth aspect is the receiver apparatus of the fourteenth or fifteenth aspect characterized in that the power supply line includes the utility line of a communication cable apparatus compliant to the HDMI standard.

Therefore, power can be supplied to the transmitter apparatus without newly adding a signal line to the prior art HDMI optical active cable compliant to the HDMI standard.

The communication system according to the seventeenth aspect is characterized by including:

a transmitter apparatus configured to output a data signal and a first connection detection signal;

a receiver apparatus configured to output a second connection detection signal in response to the first connection detection signal; and the communication cable apparatus of any one of the first to sixth aspects.

Therefore, the breakdown of the communication cable apparatus can be prevented in the reverse connection state.

The communication system according to the eighteenth aspect is characterized by including:

the transmitter apparatus of the ninth or tenth aspect;

the receiver apparatus of the twelfth or thirteenth aspect; and the communication cable apparatus of any one of the third to sixth aspects.

Therefore, the breakdown of the communication cable apparatus can be prevented in the reverse connection state.

The communication system according to the nineteenth aspect is characterized by including:

the transmitter apparatus of the seventh or eighth aspect;

the receiver apparatus of the fourteenth or fifteenth aspect; and the communication cable apparatus of any one of the third to sixth aspects.

Therefore, the breakdown of the communication cable apparatus can be prevented in the reverse connection state.

The communication system according to the twentieth aspect is characterized in that the fourth communication line is the utility line of a communication cable apparatus compliant to the HDMI standard, in the communication system of the eighteenth or nineteenth aspect.

Therefore, no signal line needs to be newly added to the prior art HDMI optical active cable compliant to the HDMI standard.

The communication system according to the twenty-first aspect is characterized in that the power supply line includes the utility line, in the communication system of the twentieth aspect.

Therefore, power supply can be performed without newly adding a signal line to the prior art HDMI optical active cable compliant to the HDMI standard.

As described above in detail, since the communication cable apparatus of the present disclosure includes the above-described switch and the above-described control circuit, the breakdown of the communication cable apparatus can be prevented in the reverse connection state.

In addition, each of the transmitter apparatus of the present disclosure, the receiver apparatus of the present disclosure, and the communication system including the above-described communication cable apparatus, the transmitter apparatus and the receiver apparatus detects the voltage level of the fourth communication line, and detects the normal connection state or the reverse connection state based on a detected voltage level. Therefore, the breakdown of the communication cable apparatus can be prevented in the reverse connection state.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A communication cable apparatus configured to transmit a data signal from a transmitter apparatus to a receiver apparatus in a predetermined one direction via a first communication line, the communication cable apparatus comprising:

a second communication line configured to transmit a first connection detection signal from the transmitter apparatus to the receiver apparatus;

a third communication line configured to transmit a second connection detection signal, which is outputted from the receiver apparatus in response to the first connection detection signal, to the transmitter apparatus;

a switch inserted in the third communication line; and a control circuit configured to turn on the switch in response to the second connection detection signal in such a normal connection state that the communication cable apparatus is connected between the transmitter apparatus and the receiver apparatus so that the data signal can be transmitted in the predetermined one direction from the transmitter apparatus to the receiver apparatus, and turn off the switch in such a reverse connection state that the communication cable apparatus is connected between the transmitter apparatus and the receiver apparatus in a direction reverse to the one direction.

2. The communication cable apparatus as claimed in claim 1, further comprising a gate circuit configured to output a connection state detection signal representing the normal connection state when the gate circuit detects the first connection detection signal and the second connection detection signal, and output a connection state detection signal representing the reverse connection state when the gate circuit detects the first connection detection signal and does not detect the second connection detection signal.

3. The communication cable apparatus as claimed in claim 2, further comprising:

a fourth communication line connected between the transmitter apparatus and receiver apparatus; and an output circuit configured to output a predetermined first voltage level to the fourth communication line in response to the connection state detection signal representing the normal connection state, and output a predetermined second voltage level to the fourth communication line in response to the connection state detection signal representing the reverse connection state.

4. The communication cable apparatus as claimed in claim 2, further comprising a first power supply circuit configured to supply power to a communication circuit of the communication cable apparatus in response to the connection state detection signal representing the normal connection state, and inhibit supplying the power to the communication cable apparatus in response to the connection state detection signal representing the reverse connection state.

5. The communication cable apparatus as claimed in claim 1, further comprising a notify apparatus configured to notify the reverse connection state.

6. The communication cable apparatus as claimed in claim 1, wherein the fourth communication line is a utility line of a communication cable apparatus compliant to an HDMI (High-Definition Multimedia Interface) standard.

7. A communication system comprising:
a transmitter apparatus configured to output a data signal and a first connection detection signal;
a receiver apparatus configured to output a second connection detection signal in response to the first connection detection signal; and
a communication cable apparatus configured to transmit the data signal from the transmitter apparatus to the receiver apparatus in a predetermined one direction via a first communication line,
wherein the communication cable apparatus comprises:
a second communication line configured to transmit the first connection detection signal from the transmitter apparatus to the receiver apparatus;
a third communication line configured to transmit the second connection detection signal, which is outputted from the receiver apparatus in response to the first connection detection signal, to the transmitter apparatus;
a switch inserted in the third communication line; and
a control circuit configured to turn on the switch in response to the second connection detection signal in such a normal connection state that the communication cable apparatus is connected between the transmitter apparatus and the receiver apparatus so that the data signal can be transmitted in the predetermined one direction from the transmitter apparatus to the receiver apparatus, and turn off the switch in such a reverse connection state that the communication cable apparatus is connected between the transmitter apparatus and the receiver apparatus in a direction reverse to the one direction.

* * * * *